US012622347B2

(12) United States Patent
Neistein et al.

(10) Patent No.: US 12,622,347 B2
(45) Date of Patent: May 12, 2026

(54) SYSTEM AND METHOD FOR TURNING IRRIGATION PIVOTS INTO A NETWORK OF ROBOTS FOR OPTIMIZING FERTILIZATION

(71) Applicant: AUTONOMOUSPIVOT LTD, Eshtao (IL)

(72) Inventors: Eyal Neistein, Herzlyia (IL); Ran Yifa, Kfar Hahores (IL); Yaroslav Don, Ramat Yohanan (IL); Yair Sharf, Aloney Aba (IL); Yuval Aviel, Eshtao (IL); Yossi Haran, Modi'in-Macccabim-Re'ut (IL)

(73) Assignee: AUTONOMOUSPIVOT LTD, Eshtaol (IL)

( * ) Notice: Subject to any disclaimer, the term of this patent is extended or adjusted under 35 U.S.C. 154(b) by 556 days.

(21) Appl. No.: 18/095,033

(22) Filed: Jan. 10, 2023

(65) Prior Publication Data

US 2024/0224840 A1 Jul. 11, 2024

(51) Int. Cl.
*A01C 21/00* (2006.01)
*A01B 69/04* (2006.01)
(Continued)

(52) U.S. Cl.
CPC .......... *A01C 21/007* (2013.01); *A01B 69/008* (2013.01); *A01B 79/005* (2013.01);
(Continued)

(58) Field of Classification Search
CPC ................ G06V 20/188; G06T 7/0012; G06T 2207/30188; G06T 2207/10036;
(Continued)

(56) References Cited

U.S. PATENT DOCUMENTS

| | | | |
|---|---|---|---|
| 2013/0104455 A1* | 5/2013 | Groeneveld | A01G 22/00 47/58.1 SC |
| 2013/0217439 A1* | 8/2013 | Ulman | H04N 23/11 455/556.1 |
| 2019/0162855 A1* | 5/2019 | McPeek | G01C 21/1652 |

FOREIGN PATENT DOCUMENTS

| | | | |
|---|---|---|---|
| CN | 112715119 | 4/2021 | |
| CN | 115349338 A | * 11/2022 | G06V 20/188 |

OTHER PUBLICATIONS

Yang, Min, et al. "Remote sensing prescription for rice nitrogen fertilizer recommendation based on improved NFOA model." Agronomy 12.8 (2022): 1804. (Year: 2022).*

(Continued)

*Primary Examiner* — Tracy Mangialaschi
(74) *Attorney, Agent, or Firm* — PEARL COHEN ZEDEK LATZER BARATZ LLP

(57) ABSTRACT

A method and system for autonomously varying fertilization levels within a field, the field being divided into a plurality of segments, using an autonomous pivot, may include: applying an amount of fertilizer using a fertilizer applicator to each segment; capturing images of each segment in at least two different spectral ranges after a time period; calculating a Normalized Difference Vegetation Index (NDVI) value for each segment of the field based on the captured images; and varying the amount of fertilizer applied to each segment after the time period, wherein the amount of fertilizer is varied based on re-captured images and re-calculated NDVI values for each segments after the time period.

22 Claims, 12 Drawing Sheets

1101 — Applying an amount of fertilizer to each segment at the start of a growing season based on a prescription.

1102 — Capturing images of each segment in at least two different spectral ranges after a discrete time period.

1103 — Calculating a reference Normalized Difference Vegetation Index (NDVI) value for each segment based on the captured images 1104 — Computing an amount of fertilizer by which the amount of fertilizer is varied and varying the amount of fertilizer applied to each segment after the discrete time period.

(51) Int. Cl.

| | |
|---|---|
| *A01B 79/00* | (2006.01) |
| *A01B 79/02* | (2006.01) |
| *G05D 1/00* | (2024.01) |
| *G06V 20/10* | (2022.01) |

(52) U.S. Cl.
CPC ........... *A01B 79/02* (2013.01); *G05D 1/0212* (2013.01); *G05D 1/0246* (2013.01); *G06V 20/188* (2022.01); *G06T 2207/10036* (2013.01); *G06T 2207/30188* (2013.01)

(58) Field of Classification Search
CPC ..... A01C 21/007; A01B 79/02; A01B 79/005; A01B 69/008; G05D 1/0246; G05D 1/0212

See application file for complete search history.

(56) References Cited

OTHER PUBLICATIONS

Cardim Ferreira Lima, et al.. 2020. "Monitoring Plant Status and Fertilization Strategy through Multispectral Images" Sensors 20, No. 2: 435, Published Jan. 13, 2020.

C. S. T. Daughtry, et al., "Estimating Corn Leaf Chlorophyll Concentration from Leaf and Canopy Reflectance", Elsevier Science Inc., vol. 74, pp. 229-239 (2000).

Jun Zhang et al., "Nitrogen deficiency and recovery in sustainable corn production as revealed by leaf chlorophyll measurements", Agronomy for Sustainable Development, Springer Verlag (Germany), Jan. 1, 2007, 27 (4), pp. 313-319.

Gina H. Mohammeda, et al., "Remote sensing of solar-induced chlorophyll fluorescence (SIF) in vegetation: 50 years of progress", Elsevier Inc., Remote Sensing of Environment 231 (2019), pp. 1-39.

* cited by examiner

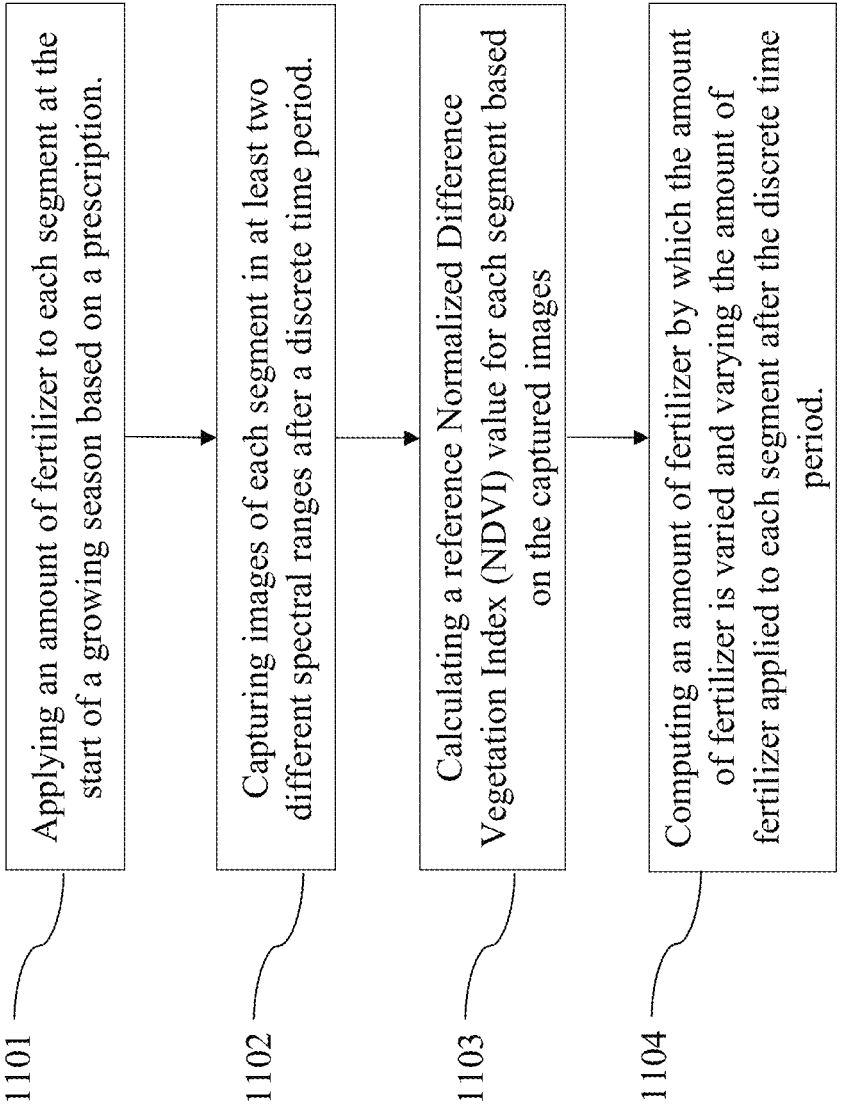

1101   Applying an amount of fertilizer to each segment at the start of a growing season based on a prescription.

1102   Capturing images of each segment in at least two different spectral ranges after a discrete time period.

1103   Calculating a reference Normalized Difference Vegetation Index (NDVI) value for each segment based on the captured images 1104   Computing an amount of fertilizer by which the amount of fertilizer is varied and varying the amount of fertilizer applied to each segment after the discrete time period.

FIG. 11

SYSTEM AND METHOD FOR TURNING IRRIGATION PIVOTS INTO A NETWORK OF ROBOTS FOR OPTIMIZING FERTILIZATION

TECHNICAL FIELD OF THE INVENTION

The present invention relates generally to the detection of fertilization levels within fields and the application of fertilizers onto a field to facilitate crop growth, more specifically to the autonomous monitoring of crop growth and the autonomous variation of fertilizer application within a field.

BACKGROUND OF THE INVENTION

Most modern agricultural practices rely on the application of fertilizers. Thereby, soil is supplied with plant nutrients, for example nitrogen, phosphorus and potassium nutrients. In particular, since the development of the Haber process in the early 20$^{th}$ century, nitrogen fertilizers have been among the most prominent fertilizers.

Whilst providing beneficial nutrients to a crop generally lead to high yields in the harvest, the provision of fertilizers may have negative environmental effects. Commonly, only a fraction of fertilizer is converted to plant matter and the remainder may accumulate in the soil or may be lost as runoff. Excessive fertilizer usage in crop production may cause soil to become enriched with mineral and nutrients. As a result, e.g. in the application of nitrogen fertilizers, nitrogen not taken up by plants may be transformed into nitrates.

This form of nutrient pollution may result in the eutrophication of water bodies and ultimately could have severe ecological effects such as decreased biodiversity and increased toxicity of drinking water, resulting in a high demand for water treatment processes.

SUMMARY OF THE INVENTION

The following is a simplified summary providing an initial understanding of the invention.

The summary does not necessarily identify key elements nor limit the scope of the invention, but merely serves as an introduction to the following description.

Embodiments of the present invention may autonomously monitor the application and impact of fertilizers, e.g. nitrogen fertilizers, for example applied on a field in relation to the crop growth of a field and autonomously vary the provided amount of applied fertilizer throughout a growing season or within a plurality of growing seasons to the growth of crops with the intention to reduce fertilizer application for a field.

Embodiments of the present invention may include the autonomous fertilization of agricultural land and for the optimization of fertilizer levels applied to land such as agricultural land. Advantages and improvements of the invention may include automatically adapting an amount of fertilizer applied to a field based on data crop growth autonomously measured for a field using an autonomous pivot.

Embodiments may improve fertilization technology by for example including communication between autonomous pivots within a network of autonomous pivots using a data cloud server in the assessment of fertilizer levels and prediction of fertilizer levels for agricultural land by autonomously evaluating crop growth within a plurality of fields in relation to agricultural parameters such as fertilizer levels.

An embodiment of the present invention may include a method of varying fertilization levels within a field, the field being divided into a plurality of discrete segments, the method comprising: applying an amount of fertilizer to each segment at the start of a growing season based on a prescription: capturing images of each segment in at least two different spectral ranges at various discrete time periods: calculating a reference Normalized Difference Vegetation Index (NDVI) value for each segment based on the captured images; and varying the amount of fertilizer applied to each segment after each discrete time period, wherein the amount of fertilizer is varied based on re-captured images and re-calculated NDVI values for each segments after each discrete time period.

An embodiment of the present invention may include a system for varying fertilization levels within a field, the field being divided into a plurality of discrete segments, the system comprising: a mobile platform configured to move about the field, the mobile platform comprising: a motor and a plurality of wheels for maneuvering the mobile platform; a multispectral camera configured to capture images in at least two different spectral ranges; a fertilizer applicator; a collection unit: a transponder: a geolocation sensor: a time sensor: a cloud server, comprising a control unit, an analytical unit, a memory component configured to store computer implementable instructions and a processor configured to implement the computer implementable instructions, such that the system is operable to: apply an amount of fertilizer using a fertilizer applicator to each segment at the start of a growing season based on a prescription, e.g. using a network of fields: capture images of each segment in at least two different spectral ranges after a discrete time period; calculate a reference NDVI value for each segment of the field based on the captured images; and vary the amount of fertilizer applied to each segment after the discrete time period, wherein the amount of fertilizer is varied based on re-captured images and re-calculated NDVI values for each segments after the discrete time period.

These, additional, and/or other aspects and/or advantages of the present invention are set forth in the detailed description which follows: possibly inferable from the detailed description: and/or learnable by practice of the present invention.

BRIEF DESCRIPTION OF THE DRAWINGS

Non-limiting examples of embodiments of the disclosure are described below with reference to figures listed below. The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings:

FIG. 11 is a flowchart of a method of varying fertilization levels within a field, according to an embodiment of the present invention.

DETAILED DESCRIPTION OF EMBODIMENTS OF THE INVENTION

Figure 1:
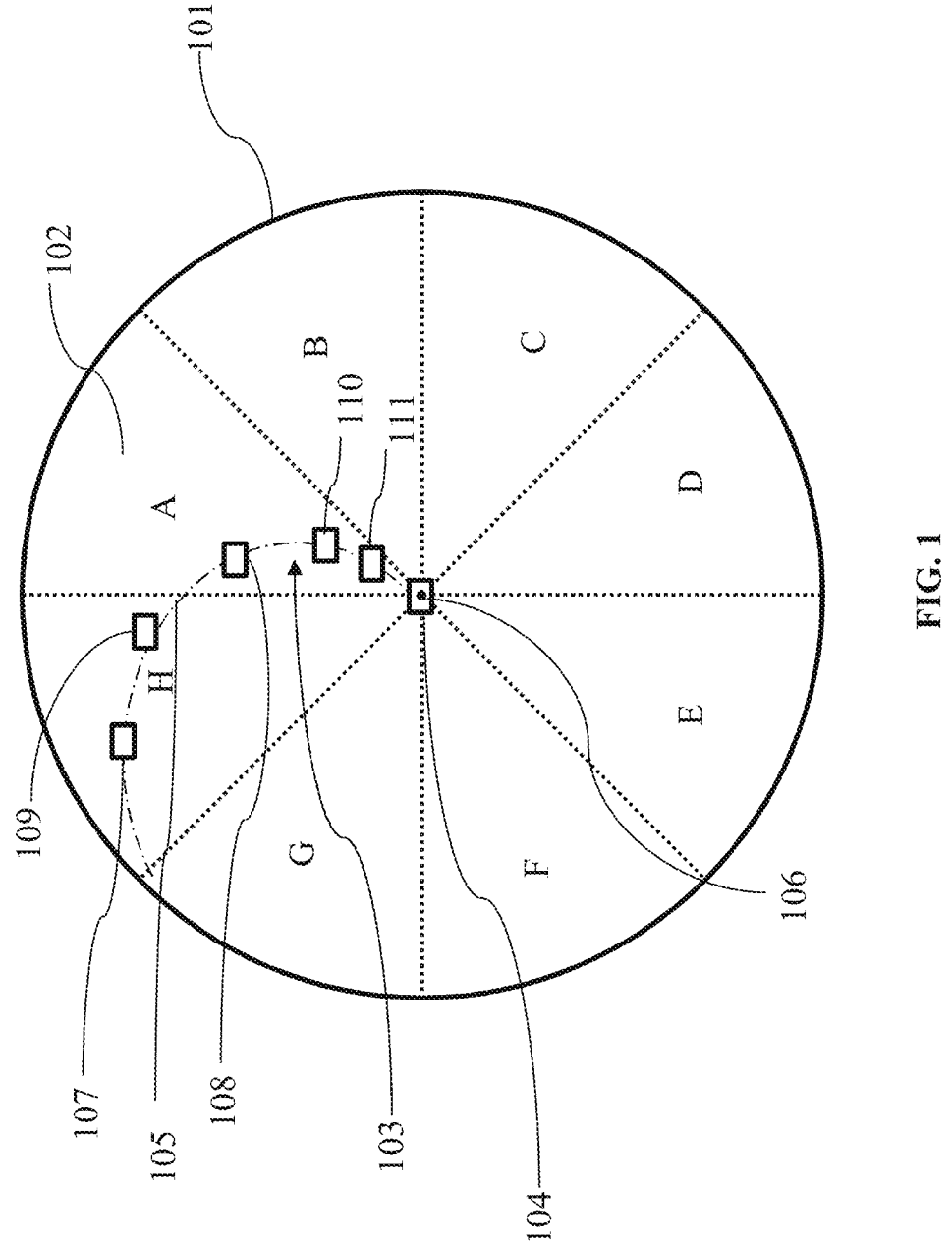
FIG. 1 schematically illustrates a mobile platform configured to move about a field, separated into segments, according to an embodiment of the present invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

The term "field" relates to portion of land suitable for growing crops or conducting agriculture. A field may be divided into a plurality of discrete segments. A field may have any form of shape, for example the field may be a circular field.

The term "segment" relates to specific area within a field for growing crops or conducting agriculture. A field may be divided into at least two segments. Segments within a field may have the same size. A discrete segment of a field may be an inspected segment or a reference segment.

A reference segment of a field may be a segment that is provided with a prescribed amount of fertilizer at the beginning of a growing season. An amount of fertilizer applied to a reference segment may have previously been applied e.g. to the same field, to a field in the same area or has been recorded as a suitable amount of fertilizer for a crop that has been planted in the specific segment.

An inspected segment may be a segment, which is prescribed a reduced amount of fertilizer in relation to a reference segment. A field comprises at least one or more of inspected segments and at least one or more of reference segments. Thereby, analysis of crop growth and fertilizer application to inspected and reference segments of a field may proceed via use of an autonomous pivot system.

An embodiment of the present invention includes a system for varying (or applying different amounts from initial amounts) fertilization levels within a field. In FIG. 1, a conceptual illustration of a field comprising an autonomous pivot system is shown. In the example disclosed herein, a field 101 for growing crops is shown from the top view. Field 101 may be divided into a number of segments, e.g. segment A 102. In the present example, field 101 is divided into eight segments labelled A-H. Each segment of a field may be regarded as a discrete segment of a field. A field may have a circular shape and may comprise a plurality of crops planted in each of the segments. Other shapes may be used.

An autonomous pivot 103 may be deployed in a field 101. Autonomous pivot 103 may comprise a motor 104 and wheels attached to a mobile platform 105 which may allow autonomous pivot 103 to be driven around center axis 106. Mobile platform 105 may be rotated around the circumference of circular field 101. During the circulation around center axis 106 of field 101, mobile platform 105 may cover an excerpt of area of field 101 at a certain time period. The speed of pivot motor 104 may be adjusted. Adjusting the speed of pivot motor 104 may lead to the provision of a frequency in which a certain part of a field 101, e.g. a segment 102 is covered by mobile platform 105.

Mobile platform 105 may be mounted with a plurality of sensing devices. A sensing device may be a multispectral camera 107. Multispectral camera 107 is configured to capture images of excerpts of field 101, e.g. excerpts of a segment 102. Images captured by multispectral camera 107 may be recorded for various spectral ranges, e.g. near-infrared (NIR). Alternatively, for each segment or for each excerpt of a segment, images may be captured in at least two different spectral ranges. Since NDVI values for a segment or for each excerpt of a segment may be calculated based on a pair of two images obtained in different spectral ranges as outlined below, images may be captured in at least two different spectral ranges. Images may be captured after a discrete time period, e.g. a time period after the start of a growing season such as a day, a week, two weeks, a month, two months, after the start of a growing season. Thus, capturing images of each segment in at least two different spectral ranges after a discrete time period may ensure that growth of a crop for each segment within a field may be assessed by the generation of NDVI values from captured images at distinct points in time within a growing season. A sensing device may be a fertilizer applicator 108. Fertilizer applicator 108 may be configured to apply an amount of fertilizer to a certain excerpt of field 101. A fertilizer applicator, e.g. fertilizer applicator 108, may apply an initial amount of fertilizer to a field or to a plurality of segments of a field. An amount of fertilizer may be determined by a prescription, e.g. a prescribed amount of fertilizer for a field applied at the start of a growing season. An amount of fertilizer for a plurality of segments of a field may be determined e.g. based on previous recordings of fertilizer amounts for a field. Alternatively, amounts of fertilizer for other fields, e.g. neighbouring fields, may be used to determine an amount of fertilizer, e.g. an initial amount of fertilizer or a prescription of fertilizer, for a field or a plurality of segments of a field. Other ways for determining an initial amount of fertilizer for each segment of a field are outlined below. A sensing device may be a sensor for geolocation and time information 109, e.g. a Global Positioning System (GPS) sensor. A geolocation and time information sensor may allow to locate images captures by multi-spectral camera 107 within a field or within a segment of a field. Sensing device 109 may be configured to provide the location of mobile platform 105 in relation to field 101.

A plurality of pivot sensing devices, for example one or more multispectral cameras 107 and one or more fertilizer applicators 108 mounted onto mobile platform 105. One or more multispectral cameras may be connected to active LED illumination. Active LED illumination connected to a multispectral camera may allow the collection of reflective light during the night. Active LED illumination connected to a multispectral camera may also allow to capture images at night.

Mobile platform 105 may be mounted with a collection unit 110, e.g. a computer comprising a processor. Collection unit 110 receives data from motor 104, a sensing device, e.g. an image of multispectral camera 107, an amount of applied fertilizer from fertilizer applicator 108 or a geolocation and time information of geolocation and time information sensor 109.

Collection unit 110 may be connected to transponder or transceiver 111. Transponder 111 is configured to transmit data collected from collection unit 110 to a cloud-based server "cloud server" and receive control commands from it. Transponder 111 may transmit data collected from collection unit 110 and receive control commands from a computer of an operator. An operator may be a human, e.g. an engineer.

Figure 2:
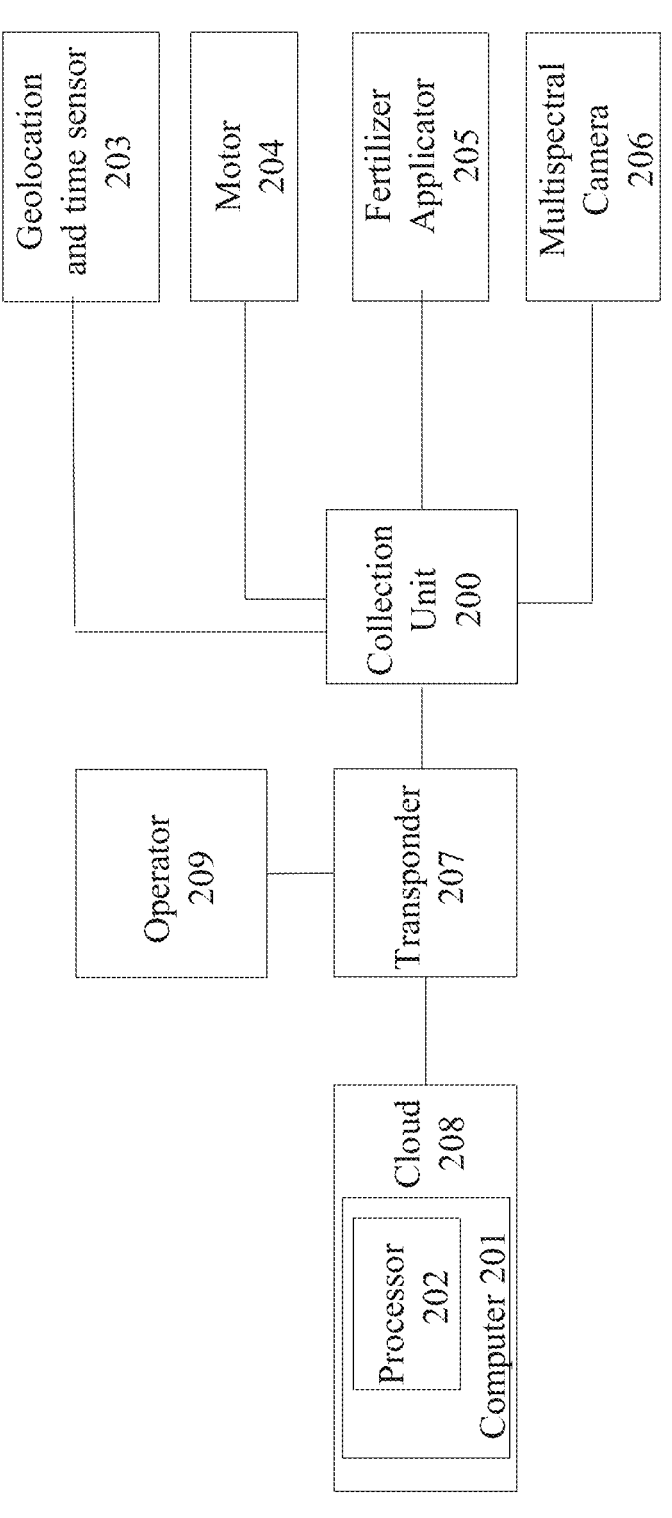
FIG. 2 is a block diagram of a system, according to an embodiment of the present invention.

Reference is now made to FIG. 2, schematically illustrating a system for managing autonomous pivots. Collection unit 200 is configured to receive data from one or more of: motor 204, multispectral camera 206, fertilizer applicator 205 and geolocation and time information sensor 203. For example, collection unit 200 may receive multispectral images captured by multispectral camera 206 and time and location for recorded images (e.g. when and where the images were captured) within the field or within a segment of a field via geolocation and time information sensor 203. Captured images, time and location for captured images may be transmitted to a cloud server, e.g. cloud server 208, via collection unit 200 and transponder 207. Collection unit 200 is configured to transmit instructions to motor 204, multispectral camera 206, fertilizer applicator 205 and/or geolocation and time information sensor 203. For example, cloud server 208 may send instructions to motor 204 or fertilizer applicator 205 via transponder 207 and collection unit 200. Collection unit 200 is connected via transponder 207 to a cloud server 208 and/or to an operator 209. Operator 209 may use a communication subsystem to receive information of transponder 207 or send commands to transponder 207. A subsystem may enable remote control of an autonomous pivot. A subsystem may be an application that runs on a device of an operator, e.g. a mobile phone, a computer or any controlling device.

Cloud server 208 comprises computer 201 and processor 202 configured to receive data from transponder 207 and transmit data to transponder 207. Cloud server 208 may also comprise an analytical unit and a control unit. An analytical unit is configured to analyses data provided via transponder 207 from collection unit 200. For example, transmitted data may comprise geolocation and time of a mobile platform of a pivot, speed of a motor 204 of a mobile platform, amount and location of applied fertilizer, and/or images captured by a multispectral camera 206.

An analytical unit may analyze data, e.g. images captured by multispectral camera 206 to determine the NDVI value for an excerpt of a segment of a field. A control unit may establish a fertilization schedule based on the analysis prepared by the analytical unit. Commands may be directed to motor 204, multispectral camera 206, fertilizer applicator 205 and/or geolocation and time information sensor 203.

Cloud server 208 may be configured to receive and transmit data from one or more autonomous pivots using transponders of one or more autonomous pivots. Cloud server 208 may comprise a control unit and an analytical unit. In an embodiment, cloud server 208 is configured to vary a fertilization level within a field, e.g. a via control unit. Cloud server 208 or a control unit of cloud server 208 may be configured to transmit data related to an amount of fertilizer, e.g. via transponder 207 and collection unit 200, to fertilizer applicator 205. An analytical unit of cloud server 208 may be configured to analyze data from collection units of one or more autonomous pivots. Thus, cloud server 208 or an analytical unit of cloud server 208 may be configured to store images captured by a multispectral camera, e.g. multispectral camera 206. Captured images by multispectral camera 206 may be transmitted to cloud server 208, e.g. via collection unit 200 and transponder 207 as shown in FIG. 2. Images of segments or excerpts of segments may be stored in at least two different spectral ranges. Data, e.g. amounts of fertilizers applied to a segment of a field, captured images using multispectral cameras, relating to multiple fields received from multiple sensing devices, e.g. sensing devices 203, 204, 205 and 206, from one or more autonomous pivots, may be compared. Comparison may be used e.g. in the determination of an amount of fertilizer for a field at the beginning of a growing season or during a growing season and in the determination of time intervals for the application of fertilizer to a field e.g. by sharing calculated NDVI values for segments of fields or fields.

Variation of fertilization levels within a field may refer to varying the amount of fertilizer applied to a field or a segment of a field, e.g. by a fertilizer applicator. Variation in the amount of fertilizer for a segment of a field or a field may be determined by the calculation of NDVI values for segments and following comparison of NDVI values and fertilizer amounts of segments. Cloud server 208 or an analytical unit of cloud server 208 may be configured to calculate NDVI values for each segment based on captured images for a segment. In addition, cloud server 208 or a control unit of cloud server 208 may be configured to instruct a fertilizer applicator, e.g. fertilizer applicator 205 to vary an amount of fertilizer for a segment based on calculated NDVI values. In other embodiments, calculations described herein need not be performed by a cloud server: e.g. they may be performed locally.

A variation of an amount of fertilizer applied by fertilizer applicator (e.g. fertilizer applicator 205) may be based on the evaluation of NDVI values for a segment of a field. NDVI values for a segment of a field calculated from images captured at a discrete point in time may be compared to re-calculated NDVI values generated from re-captured images for a segment of a field after a discrete time period. A change in an NDVI value, e.g. for a segment of a field, may be evaluated in view of an amount of applied fertilizer, e.g. by cloud server 208, to define a variation of fertilizer for a segment of a field after a discrete time period.

Cloud server 208 (e.g. an analytics unit of cloud server 208) or another computing device disclosed herein may be configured to compare NDVI values in relation to applied amounts of fertilizer for a segment of a field with other segments of a field. In an embodiment, a comparison of NDVI values may be carried out within segments of the same field. In an embodiment, a comparison of NDVI values may be carried out within segments of another field. For example, an amount of fertilizer may be applied to a first subset of a plurality of discrete segments of a field at a first time, e.g. at the start of a growing season, that is reduced compared to an amount of fertilizer that is applied comparative to a remainder of a plurality of discrete segments of the field. A first subset of segments including a reduced amount of fertilizer may be referred to as "inspected segments". A remainder of the plurality of segments may be referred to as "reference segments". After a certain time period, images may be captured for segments or excerpts of segments for inspected segments and reference segments, e.g. using a multispectral camera such as multispectral camera 206 disclosed in FIG. 2 and may be transmitted to cloud server 208 or an analytics unit of cloud server 208. Cloud server 208 may be configured to calculate NDVI values for inspected segments and reference segments and may be configured to compare NDVI values for inspected segments and reference segments.

Figure 3:
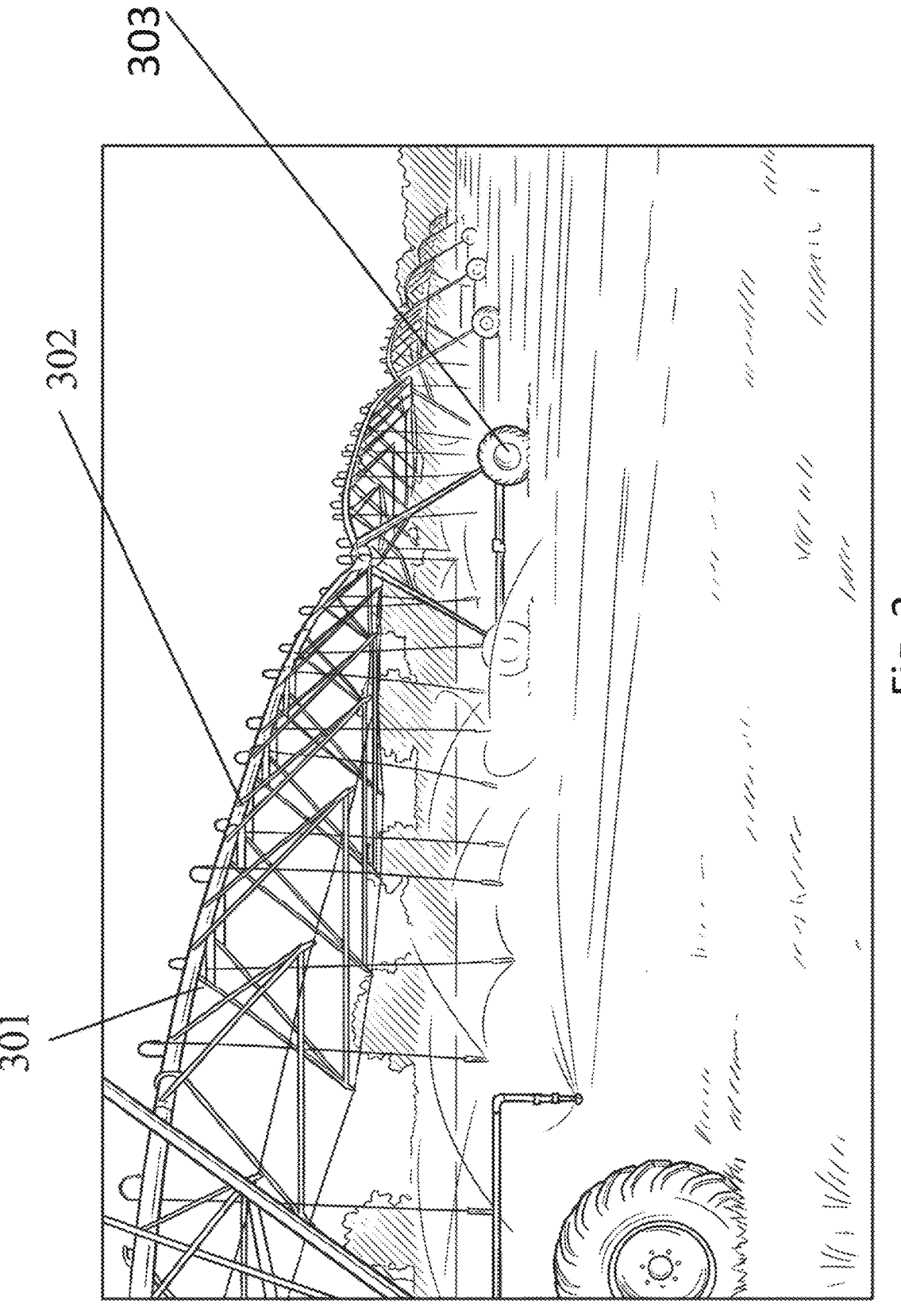
FIG. 3 schematically illustrates a mobile platform mounted with one or more sensors, according to an embodiment of the present invention.

In FIG. 3, an exemplary image of a mobile platform 301 of an autonomous pivot is disclosed. Mobile platform 301 comprises platform 302 to mount sensors on the platform. Platform 302 may be configured for the attachment of wheels 303 that allow circular rotation of mobile platform 301 around the center axis.

In addition to the aforementioned sensing devices, a mobile platform of an autonomous pivot may include other sensing devices, e.g. ground penetrating radar sensor and weather sensors such as a rain sensor or a temperature sensor, a chlorophyll camera and/or a pressure sensor. Sensors may be mounted onto the mobile platform 301 and may be configured to send and receive data from a collection unit.

A proximity sensor configured to detect the presence of objects nearby the autonomous pivot may facilitate autonomous navigation of the mobile platform around a field and may be mounted onto a mobile platform. The proximity sensor may be configured to send and receive data from a collection unit, e.g. a proximity sensor may emit an electromagnetic field, may monitor changes within the applied electromagnetic field, and may provide a collection unit with information on the presence of nearby objects that may disturb rotation of a mobile platform around the center axis.

Figure 4:
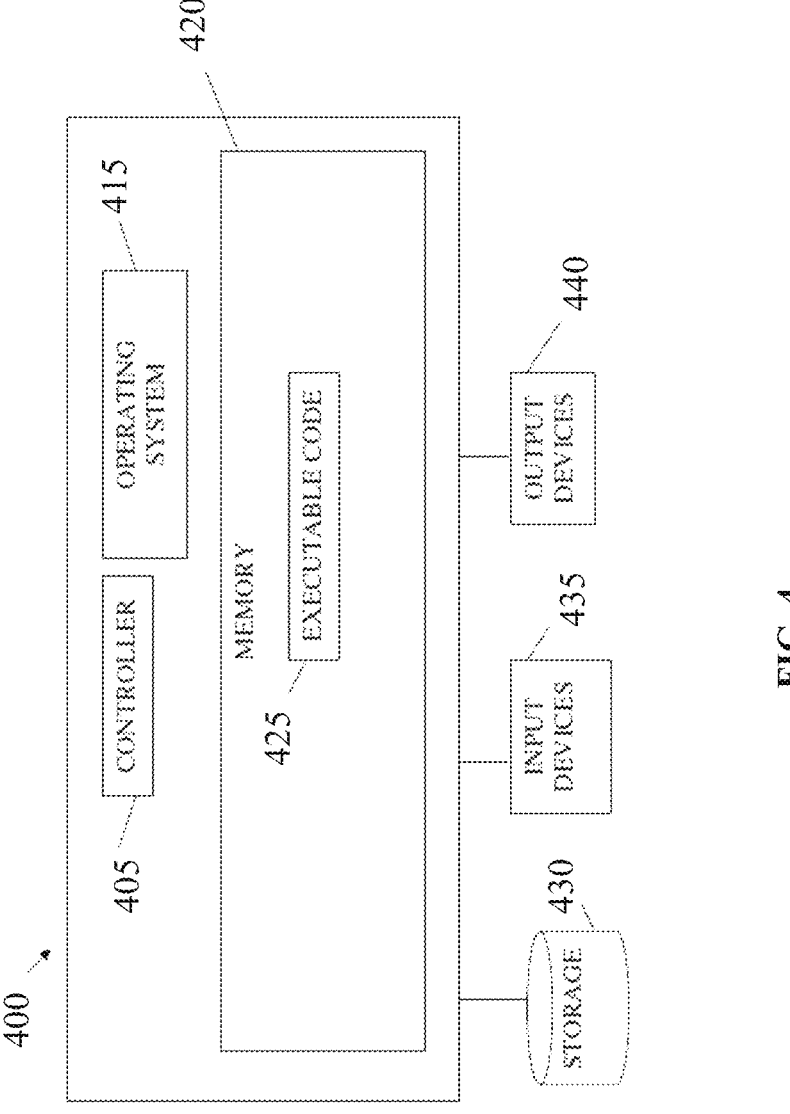
FIG. 4 shows a high-level block diagram of an exemplary computing device which may be used with embodiments of the present invention.

The computers, modules, or software systems disclosed herein may be or be executed by a computer system of the type depicted in FIG. 4. FIG. 4 shows a high-level block diagram of an exemplary computing device which may be used with embodiments of the present invention. Computing device 400 may include a controller or computer processor 405 that may be, for example, a central processing unit processor (CPU), a chip or any suitable computing device, an operating system 415, a memory 420, a storage 430, input devices 435 and output devices 440 such as a computer display or monitor displaying for example a computer desktop system. Each of modules and equipment such as software programs computer desktop system, servers, server software and other modules discussed herein may be or include, or may be executed by, a computing device such as included in FIG. 4, although various units among these modules may be combined into one computing device.

Operating system 415 may be or may include code to perform tasks involving coordination, scheduling, arbitration, or managing operation of computing device 400, for example, scheduling execution of programs. Memory 420 may be or may include, for example, a Random Access Memory (RAM), a read only memory (ROM), a Flash memory, a volatile or non-volatile memory, or other suitable memory units or storage units. Memory 420 may be or may include a plurality of different memory units. Memory 420 may store, for example, instructions (e.g. code 425) to carry out a method as disclosed herein, and/or data such as low-level action data, output data, etc.

Executable code 425 may be any application, e.g. a program, process, task or script. Executable code 425 may be executed by controller 405 possibly under control of operating system 415. For example, executable code 425 may be one or more applications performing methods as disclosed herein. In some embodiments, more than one computing device 200 or components of device 400 may be used. One or more processor(s) 405 may be configured to carry out embodiments of the present invention by, for example, executing software or code. Storage 430 may be or may include, for example, a hard disk drive, a floppy disk drive, a Compact Disk (CD) drive, a universal serial bus (USB) device or other suitable removable and/or fixed storage unit. Data described herein may be stored in a storage 430 and may be loaded from storage 430 into a memory 420 where it may be processed by controller 405.

Input devices 435 may be or may include a mouse, a keyboard, a touch screen or pad or any suitable input device or combination of devices. Output devices 440 may include one or more displays, speakers and/or any other suitable output devices or combination of output devices. Any applicable input/output (I/O) devices may be connected to computing device 400, for example, a wired or wireless network interface card (NIC), a modem, printer, a universal serial bus (USB) device or external hard drive may be included in input devices 435 and/or output devices 440.

Embodiments of the invention may include one or more article(s) (e.g. memory 420 or storage 430) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

An embodiment includes a system for the reduction of fertilizer applied to a field, e.g. a crop field, using an autonomous pivot. Sensing devices mounted onto a mobile platform of an autonomous pivot may monitor crop grow within segments of a field throughout a growing season of a crop. A growing season may thereby be defined as a time period that is initiated by planting seeds in the soil and ends with the harvest of a crop. Thus, a time period for a growing season may vary depending on different factors, e.g. a growing season may vary depending on the type of crop, the climate of the region of the field, fertilization levels of the soil, soil composition, temperature curve during a growing season.

A growing season may be any time interval in which local conditions permit plant growth. A growing season may be specific to a crop or plant.

A growing season may, for example, be a time interval of 1 day, 10 days, 20 days, 30 days, a month, 2 months, 3 months, 4 months, 5 months, 6, months, 7 months, 8 months, 9 months, 10 months, 11 months, 12 months, a year, two years.

At the beginning of a growing season, an amount of fertilizer, for example nitrogen fertilizer, may be applied to each segment of a field based on an initial prescription. An initial amount of fertilizer may be applied via a fertilizer applicator.

An initial amount of fertilizer may be an amount of fertilizer applied by a farmer in a previous year to a specific segment or a field. Alternatively, an initial amount of fertilizer as an initial prescription may be based on an analysis of nutrients present in a segment or a field. An initial amount of fertilizer may be based on climate conditions for a segment or a field. Alternatively, an initial amount of fertilizer for a segment or a field may be determined based on the crop that is to be planted in that segment or field. An initial amount of fertilizer as an initial prescription may be based on an amount of fertilizer used in the fertilization of nearby fields, e.g. neighbouring fields. As understood by a person skilled in the art, different crops require distinct types and amounts of fertilizer.

A cloud server, e.g. cloud server 208, may be configured to receive data from a plurality of connected mobile platforms of a plurality of fields. An amount of fertilizer applied at the beginning of a growing season in a prescription determined based on data received from a plurality of connected mobile platforms of a plurality of fields. Data obtained for a field or for segments of a field, e.g. fertilization levels or NDVI values from fields such as neighboring fields, may be stored on a cloud server, e.g. cloud server 208 as depicted in FIG. 2. Cloud server 208 may be configured to store data related to fields or segments of fields that is generated from other mobile platforms, such as autonomous pivots. For example, an initial prescription of fertilizer for a field may be determined by evaluating fertilizer applied to neighboring fields of a field and applying an initial prescription of fertilizer to each segment at the start of a growing season that is based on an amount of fertilizer applied to a neighboring field. In an embodiment, machine learning may be used to identify an initial prescription of fertilizer applied to a field based on evaluating retrieved NDVI values in relation to retrieved fertilizer amounts applied to a plurality of fields.

Data, such as NDVI values and fertilizer amounts, retrieved from other fields, e.g. neighboring fields, fields in the same climatic zone, fields of a specific soil type, or fields for growing a specific crop type, provided by a plurality of mobile platforms to a cloud server, e.g. cloud server 208, may be evaluated using machine learning to predict an initial prescription of fertilizer applied to a field based on recorded data. In addition to the evaluation of NDVI values retrieved from a plurality of mobile platforms, data, e.g. soil moisture levels based on the moisture detection and/or irrigation and weather conditions, retrieved from the plurality of mobile platforms may additionally be used in determining an amount of fertilizer applied to a field or in estimating a prescription of fertilizer initially applied to a field.

Due to a size of a field, planting seeds in the soil within a segment or a field may occur over a certain time period. For example, the period for seeding a segment within a field with a crop may take an hour, 6 hours, 12 hours, 24 hours, 48 hours, a day, two days, three days, four days or a week. Thus, seeding times for a section of a segment, a segment and/or a field may be later evaluated to determine an accurate seeding time for a segment or a field. Measuring and determining precise seeding times may allow an accurate comparison between segments of a field or fields that have been seeded at different seeding times owing to the periodical rotation of mobile platforms of autonomous pivots.

In addition to a seeding time for a segment, the irrigation for parts of a segment, a segment or a field may be determined, e.g. by computer system 201 or another computer system. For example, irrigation for a full field can take an hour, 6 hours, 12 hours, 24 hours, 48 hours or a week.

For example, an amount of fertilizer initially applied to segments of a field F, for example inspected segments and reference segments, may be derived from amounts of fertilizers of a group of fields G that share properties of field F. Fields that have the same soil type and/or the same crop type and/or the same climate as field F may be part of a group of fields G. Value $P(x)$ may be defined as a fertilization level at a percentile x for group G. Thus, $P(50)$ may be the median of fertilization in group G. Value $Q(m)$ may be defined as the percentage value of a fertilization level in group G. For example, a group of fields G may have a percentage value of fertilization level such as $Q(P(50))=50$.

A field F may have a reference fertilization level $m_1$ for reference segments and an inspected fertilization level $m_2$ for inspected segments. An inspected fertilization level $m_2$ may be calculated from a reference fertilization level $m_1$ via Formula 1. A fertilization level of an inspected segment $m_1$ may be multiplied with a ratio of fertilization levels $P(x)$ and $(P(y)$ that are the fertilization levels of defined percentiles of a group of fields G. Percentiles may be based by a user on agronomic estimate. For example, the defined percentiles of a group of fields G are $P(x)=P(50)$ and $P(y)=P(40)$. Exponent $min(Q(m_1)/50, 1)$ may be the minimum value of the percentage value of the reference fertilization level in reference segment $m_1$ of field F divided by the median percentage value of the fertilization levels of the group of fields G (as defined above: $Q(P(50))=50$):

$$m_2 = m_1 \cdot [P(y)/P(x)]^{min(Q(m_1)/50,1)} \qquad \text{Formula 1}$$

Following an initial amount of fertilizer, an autonomous pivot may monitor growth of crops during a growing season. Monitoring growth of crops within a field may be conducted by sensing devices mounted onto an autonomous pivot (e.g. soil-moisture device, leaf-area index). Autonomous pivot may rotate around a center axis thereby enabling sensing devices to monitor growths of crops in excerpts of segments of a field.

In particular, growth of crops may be monitored by capturing images of segments or excerpts of segments using one or more multispectral cameras mounted onto a mobile platform and one or more geolocation and time information sensing devices, e.g. a Global Positioning System (GPS) sensing device. The sensing device may be configured to provide a processor of a collection unit with position and time information received from a satellite-based positioning system such as global positioning system (GPS). A multispectral camera may thereby be linked to a geolocation and time information sensing devices. A collection unit may be configured to link information provided by a geolocation and time information sensing device to an image captured by the multispectral cameras for a defined position. An image captured by a multispectral camera may thereby be linked to a time and location within a growing season and within a segment of a field.

A multispectral camera comprises a number of color elements, e.g. five color elements. A multispectral camera may have at least two color elements. Each color element may include a color filter and an image sensor.

A multispectral camera may be mounted onto an autonomous pivot. A multispectral camera may be connected to a collection unit. A collection unit is connected to a transponder that may transmit image data via a protocol, e.g. WiFi or any other standard protocol that provides data connections.

Images of excerpts of segments of a field may be captured throughout a growing season. Images captured for an excerpt of a segment of a field in two or more spectral ranges may be stored in a cloud server 208, as outlined in FIG. 2, and may be used to determine a NDVI value for an excerpt of a segment of a field. NDVI values may thereby be automatically calculated by an analytical unit of cloud server 208.

An NDVI value is a value that defines whether a target being monitored contains live green vegetation. An NDVI value may be calculated by comparing the values of reflection and absorption of red and infrared light.

As such, an NDVI value is an indicator that is used to assess whether a target, e.g. a surface on earth, comprises live green vegetation and therefore may be used to monitor the growth of a crop. In some embodiment, the NDVI value may be closely correlated with the fertilization level, e.g. nitrogen fertilization level of the soil.

An NDVI value may be calculated via example Formula 2:

$$NDVI = (\alpha A + \beta B + \gamma C + \delta)/(\varphi A + \chi B + \psi C + \xi) \qquad \text{Formula 2}$$

Referring to Formula 1, parameters A, B, C are spectral reflectance measurements acquired from the images captured in the infrared, red and green spectral ranges and parameters $\alpha$, $\beta$, $\gamma$, $\delta$, $\varphi$, $\chi$, $\psi$, $\xi$ are constants.

Generally, for measurements of the spectral reflectance acquired for two spectral ranges, e.g. in the red (visible) region (RED) and near-infrared region (NIR), the NDVI is described as the difference between the intensities of NIR and RED divided by the sum of intensities of NIR and RED and can be calculated according to example Formula 3:

$$NDVI = (NIR - RED)/(NIR + RED) \qquad \text{Formula 3}$$

Formula 3 may be derived from Formula 2 by defining constant A as a pixel value obtained in the NIR region, constant B as a pixel value obtained in the RED region, defining parameters $\alpha=1$, $\beta=1$, $\chi=1$ and $\varphi=1$, and defining remaining constants $\gamma$, $\delta$, $\psi$, $\xi$ by the value 0. The RED region may relate to an image captured at a wavelength of about 670 nm. The NIR region may relate to an image captured at a wavelength of about 850 nm.

The green region may relate to an image captured at a wavelength of about 530 nm and may refer to spectral reflectance measurements obtained for parameter C. In the case of an image captured in the green region, parameters $\gamma$ and $\psi$ would be defined as $\gamma=1$ and $\psi=1$.

Spectral reflectances are defined as ratios of reflected radiation to incoming radiation in a spectral band and take a value between 0 and 1. Thus, obtained NDVI values are in the range of −1 to +1.

For example, when a picture is captured by a multispectral camera in two spectral ranges, a pair of images is captured including an image taken at the RED and an image taken at the NIR wavelength. Each image of the pair of images may include pixel values obtained by measuring the reflection light from a photographed surface at each wavelength.

In Formula 3, the values for NIR and RED correspond to the pixel values that have been obtained from the intensities of the captured RED wavelength image and the NIR wavelength image. An NDVI value may be determined by the difference in pixel values obtained for a pixel in the NIR image and the corresponding pixel in the RED image having the same location within the captured image divided by the sum of pixel values for NIR image and RED image at the defined location of the pixel.

Figure 5:
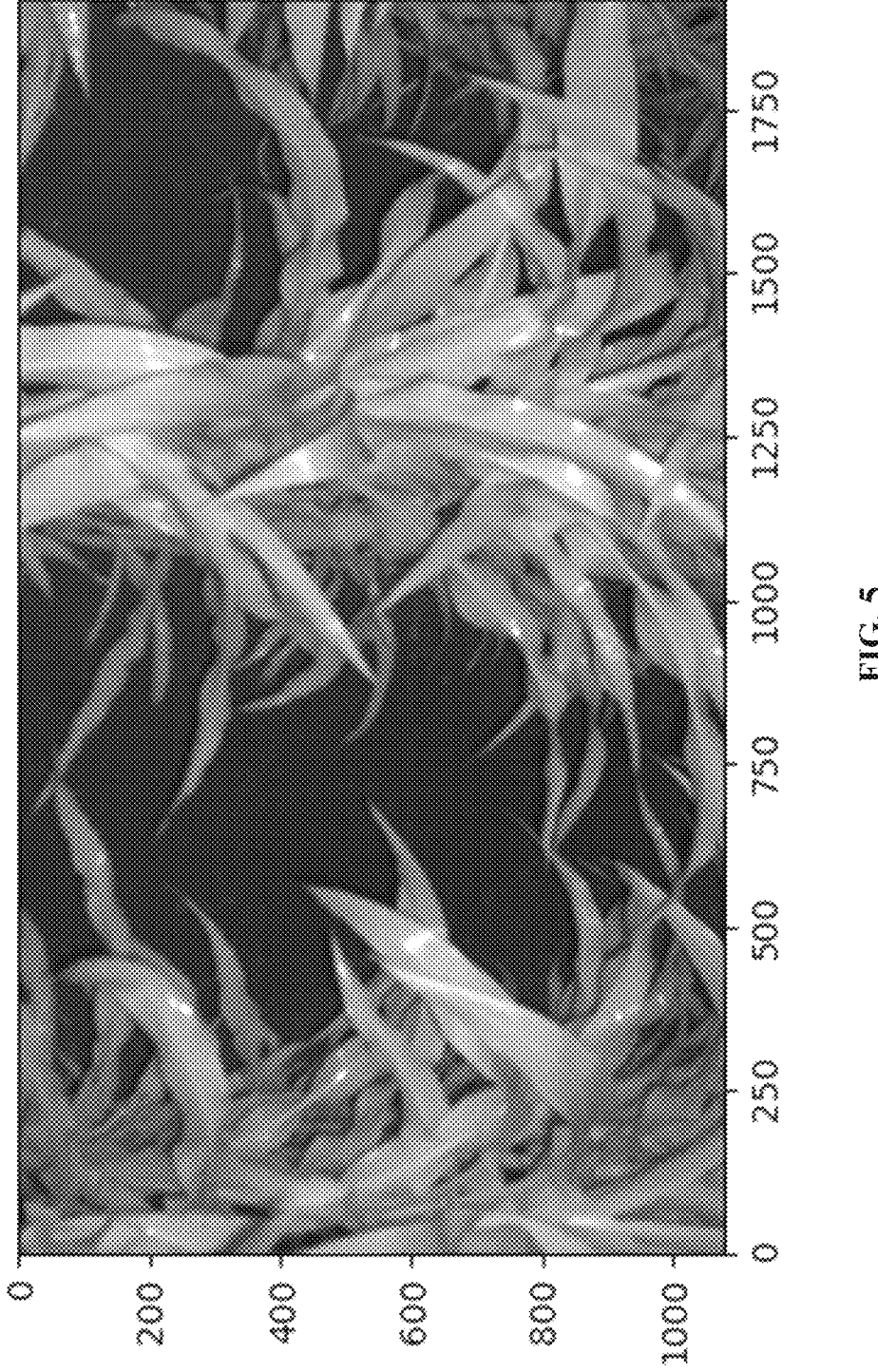
FIG. 5 schematically illustrates a captured infra-red image (recorded at a wavelength of 850 nm) of an excerpt of a corn plant, according to an embodiment of the present invention.
Figure 6:
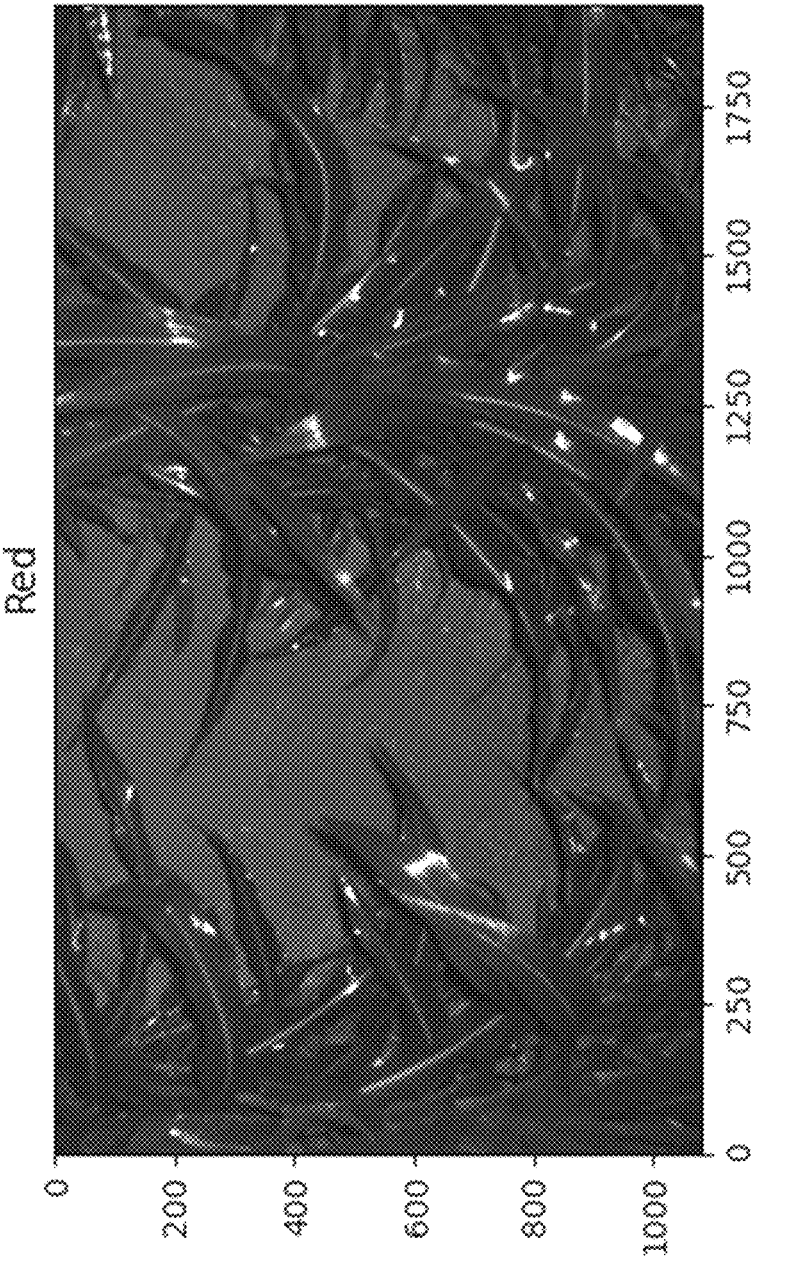
FIG. 6 schematically illustrates a captured red image (recorded at a wavelength of 850 nm) of an excerpt of a corn plant, according to an embodiment of the present invention.
Figure 7:
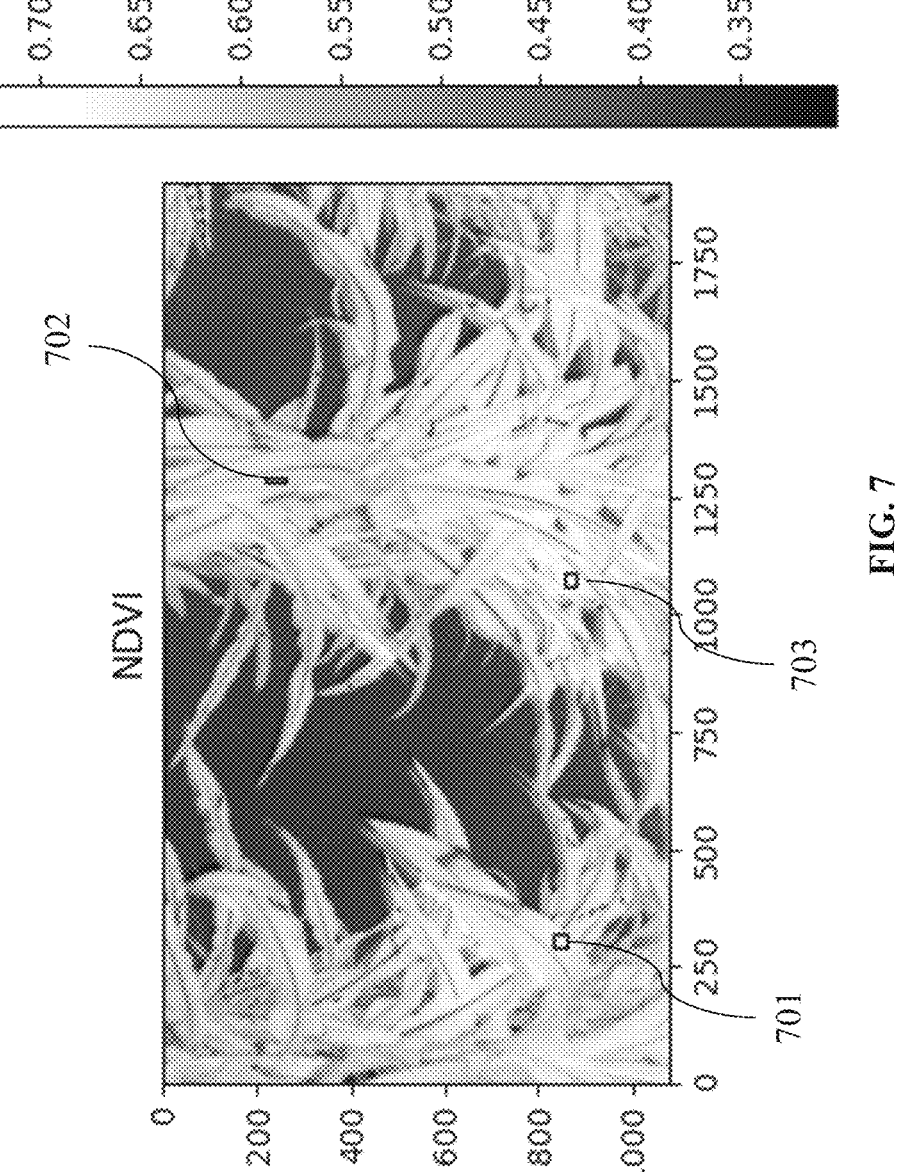
FIG. 7 schematically illustrates a calculated NDVI image for an excerpt of a corn plant, according to an embodiment of the present invention.

An example for a generation of an NDVI value image as a result of multiple captured images in the infra-red light spectrum and red-light spectrum for part of a corn crop is detailed in FIGS. 5-7:

FIG. 5 is a captured image of part of a corn crop recorded in an infra-red light spectrum (captured at a wavelength of 850 nm).

FIG. 6 is a captured image of part of a corn crop recorded in a red light spectrum (captured at a wavelength of 670 nm).

FIG. 7 is a visualized NDVI image for corn. The image is generated according to Formula 3 by subtracting pixel values obtained for an image recorded in a red light spectrum as shown in FIG. 7 from pixel values obtained for an image recorded in an infra-red light spectrum (e.g. as disclosed in FIG. 5) and dividing the difference in pixel values by a value obtained for the sum of pixel values for the image recorded in a red light spectrum (e.g. as disclosed in FIG. 6) and the image recorded in the infra-red light spectrum. Light-colored pixels within the NDVI image of FIG. 7 relate to a large NDVI value. Dark-colored pixels within FIG. 7 relate to a small NDVI value.

NDVI values for three regions of plants shown in FIG. 7 have been highlighted: lower left region 701 has an averaged NDVI value of 0.653+/−0.008: upper middle region 702 has an averaged NDVI value of 0.626+/−0.008 and lower middle region 703 has an averaged NDVI value of 0.677+/−0.008.

The resulting NDVI values calculated via Formula 3 are values that have been calculated without taking into consideration other environmental effects, e.g. light illumination or sunlight or moon light reflection-vs-incidence angles associated with the individual pixels and, thus, some of the calculated NDIVI values may include errors. Therefore, NDVI values may be corrected taking into account environmental factors.

An NDVI value for a captured image may be segmented using one or more example factors of:
(i) number of leaves within a plant and the specific location of each leaf (top, middle, bottom),
(ii) specific location within a leaf (outskirt, center, spine),
(iii) leaf angular orientation, and
(iv) distance from the camera.

The segmentation of captured images may be executed by an analytics unit within a cloud server, e.g. cloud server 208. Images of leaves are located within a plant based on shape.

Leaves may be determined as top leaves, middle leaves or bottom leaves based on recorded images, e.g. by the multispectral camera. Since the camera is located above the plant, e.g. as detailed by the location of the sensors in FIG. 3, an analytics unit within a cloud server, e.g. cloud server 208, may assess the shape of leaves, size of leaves and cover of leaves by other leaves: For example, leaves that appear small may be identified as bottom leaves; leaves that are partially covered may be identified as lower leaves: leaves that appear large may be identified as top leaves: and leaves that appear as uncovered by other leaves may be identified as top leaves.

Additionally, an analytics unit of a cloud server, e.g. cloud server 208, may be configured to assess an image based on the specific location within a leaf, e.g. spine (center) of a leaf. An analytics unit of a cloud server, e.g. cloud server 208, may be configured to assess the orientation of leaves in a captured image. The orientation of a leaves may be determined in relation to a vector that is perpendicular to the leaf plane and the line of sight. Deviations from the vector may allow calculation of an angle of a leaf in relation to the leaf plane.

To account for a dependency of the camera height of recorded images in relation to a calculated NDVI value, spectral cameras, e.g. mounted on a mobile platform, may be calibrated to a standard NDVI value in relation to a defined camera height prior to capturing images.

Figure 8:
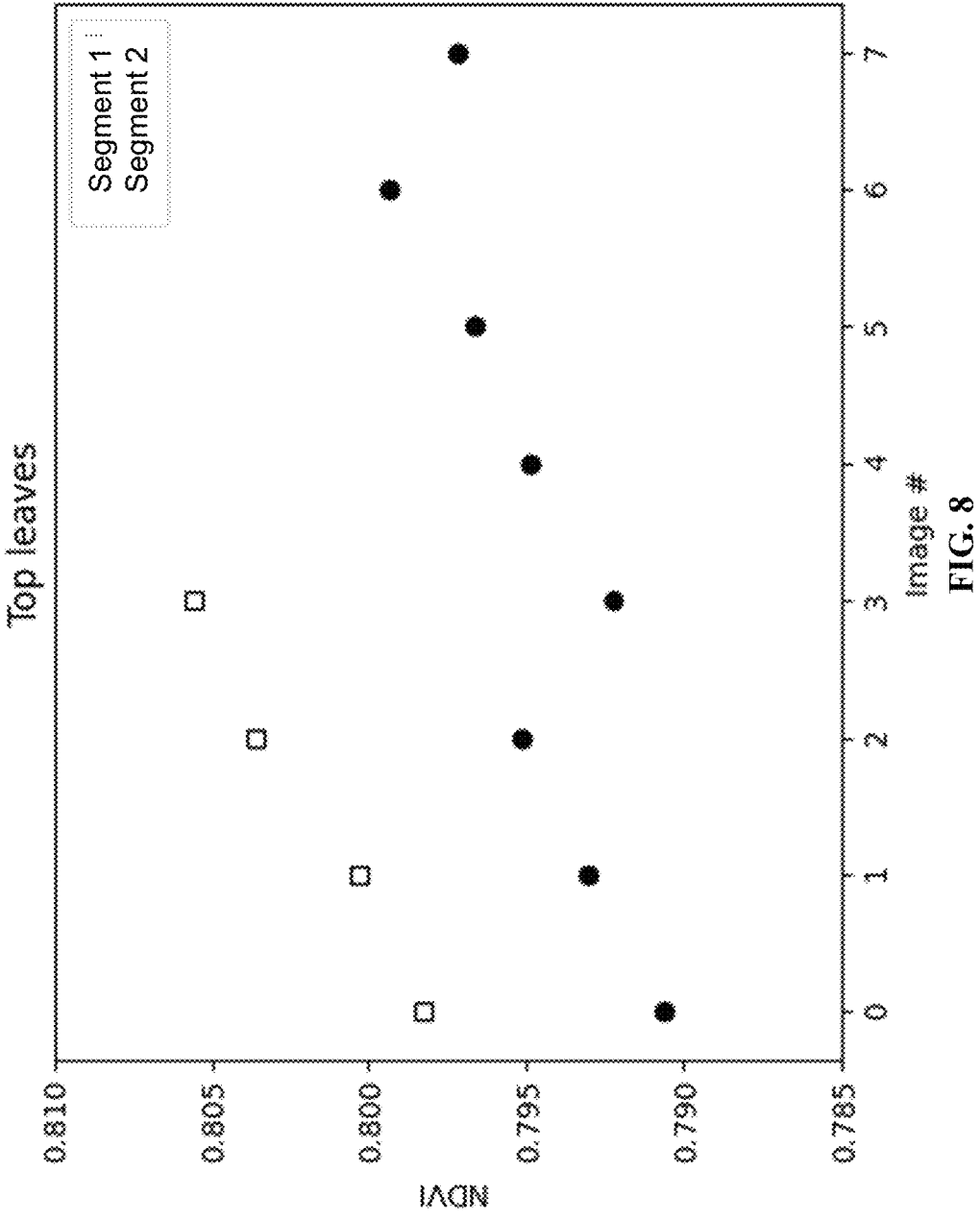
FIG. 8 schematically illustrates calculated NDVI values for images of Segment 1 and Segment 2 of a field considering top leaves of a crop in the calculation of NDVI values.
Figure 9:
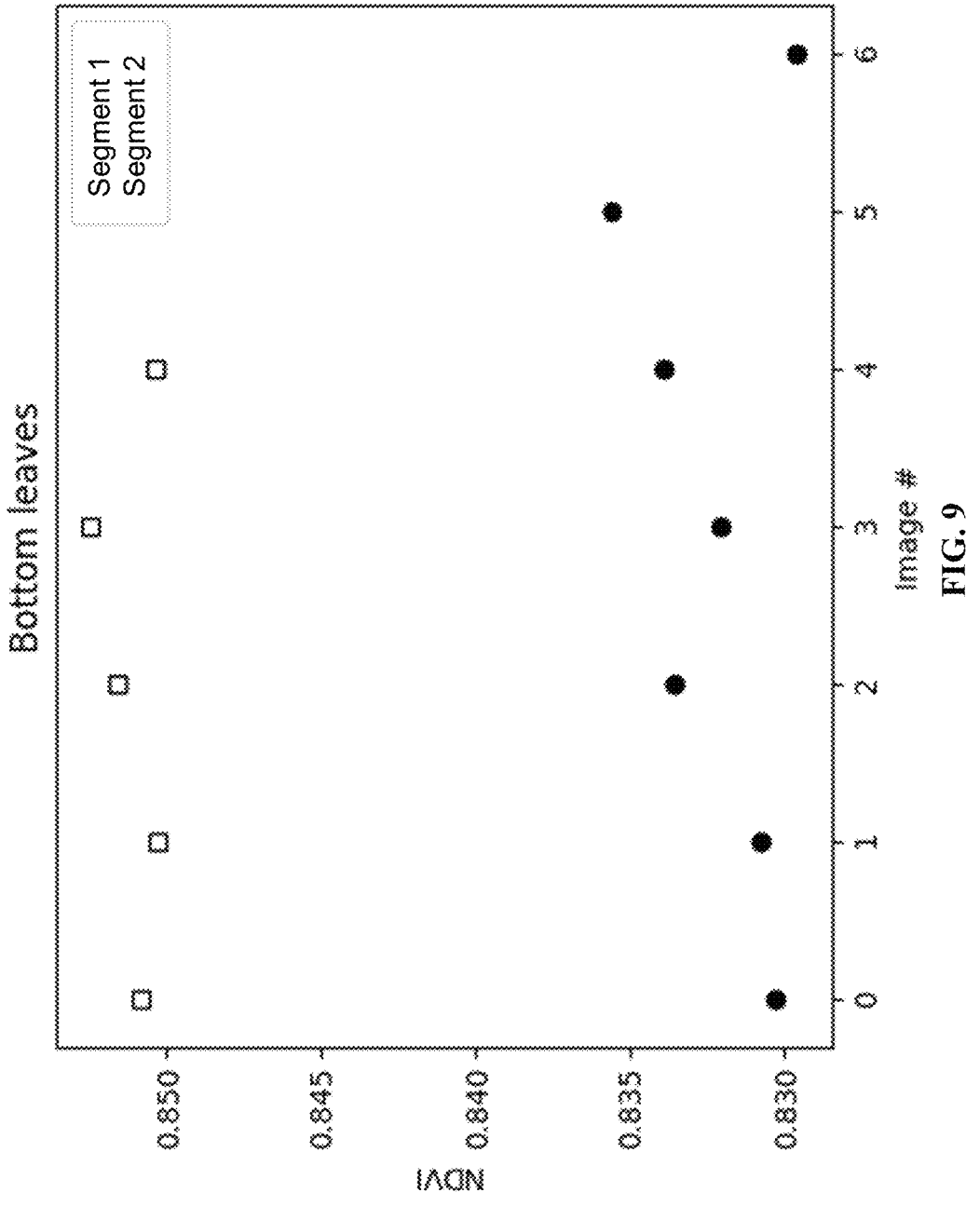
FIG. 9 schematically illustrates calculated NDVI values for images of Segment 1 and Segment 2 of a field considering bottom leaves of a crop in the calculation of NDVI values.

FIG. 8 shows a chart of NDVI values for top leaves, located at the top of a plant. NDVI values have been recorded for two segments. Data points related to segment 1 and segment 2 relate to NDVI values of two different segments from the same field. The distribution of NDVI values obtained for images 0-3 for segment 1 ranges from about 0.798 to about 0.806. The distribution of NDVI values obtained for images 0-7 for segment 2 ranges from about 0.791 to about 0.799. FIG. 9 shows a chart of NDVI values for bottom leaves, located at the bottom of a plant. NDVI values have been recorded for two segments. Data points related to segment 1 and segment 2 relate to NDVI values of two different segments from the same field. The distribution of NDVI values obtained for images 0-4 for segment 1 ranges from about 0.850 to about 0.852. The distribution of NDVI values obtained for images 0-6 for segment 2 ranges from about 0.829 to about 0.836. Comparing ranges for NDVI values of FIG. 8 and FIG. 9, it may be concluded that the distribution of data points for segment 1 and segment 2 of the bottom leaves are narrower than NDVI values obtained for the corresponding top leaves.

Segmentation of NDVI values may be achieved by assessing one or more example factors of:
(i) Total leaf area, and
(ii) estimate of the plant-mass.

Segmentation factors for NDVI values may be deducted from other sensors. Segmentation of NDVI values may be achieved by assessing one or more example factors of:
(i) accurate seeding time,
(ii) irrigation history, and
(iii) field history from previous seasons.

NDVI values for images within a discrete segment of a field may be used in the calculation of a mean NDVI value for a segment. A mean NDVI value $NDVI_{mean}$ is calculated by calculating an arithmetic mean of a number N of $NDVI_i$ values for a segment according to example Formula 4.

$$NDVI_{mean} = \frac{1}{N}\sum_{i=1}^{N} NDVI_i \qquad \text{Formula 4}$$

$NDVI_{mean}$ may be calculated for inspected segments and for reference segments. The provision of a mean NDVI value may improve statistical accuracy of NDVI values measured within a segment of a field.

An operator may receive processed NDVI value data from an analytics unit of cloud server 208 via communications sub system.

Figure 10:
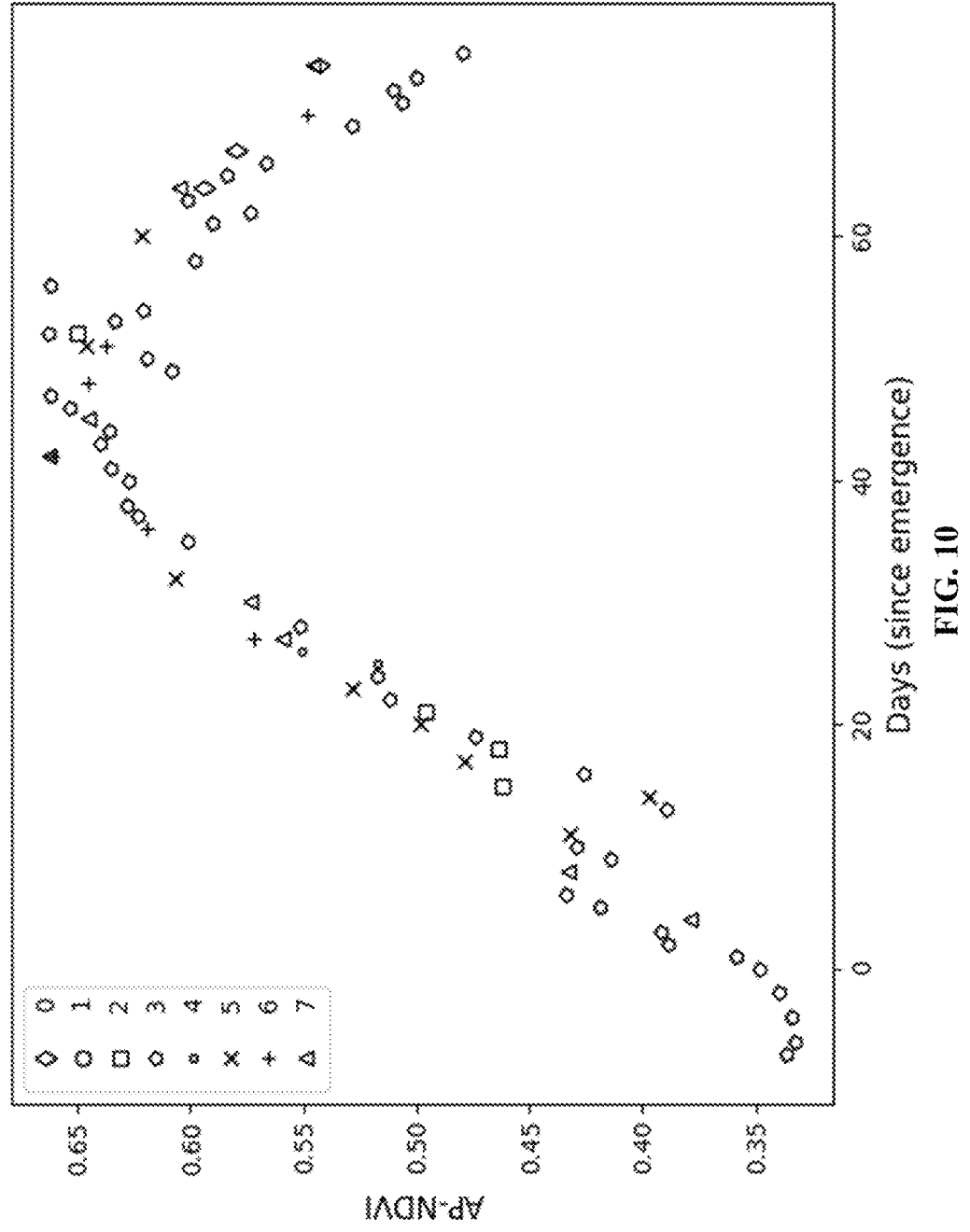
FIG. 10 schematically illustrates calculated NDVI values for eight individual segments (0-7) of a single field during a growing season for a potato crop, according to an embodiment of the present invention.

In FIG. 10, an example of a visualized NDVI value data set provided to a communications sub-system of an operator is detailed. FIG. 10 displays data-sets of NDVI values recorded for a growing period of a field of potato crops. The field of potato crops is separated into eight segments (segments 0-7) and NDVI values for each segment are recorded during a growing season.

Each data point recorded in FIG. 10 represents a mean NDVI value generated for a segment. For example, each data point is a mean NDVI value calculated from a plurality of images for a specific segment (0-7). The plurality of images may be recorded in two spectral wavelengths as disclosed herein, such as in the infra-red light spectrum (850 nm) and in the red-light spectrum (670 nm). NDVI values are then calculated for each pair of pixels values for a specific location in the IR image and in the RED image.

The comparison of mean NDVI values for inspected and reference segments within a field may allow assessment of the growth of a crop in a field that has been exposed to different levels of fertilizer.

The initial prescription of fertilizer applied to segments of a field may define one or more different initial amounts of fertilizer that are applied to a subset of a plurality of segments, defined as inspected segments and reference segments.

At the beginning of a growing season, segments within a field may be prescribed an initial prescription of an amount of fertilizer that has been applied in the previous year. A segment that is prescribed an initial amount of fertilizer based on a previous year may (e.g. using information from nearby or similar fields) be referred to as a reference segment. A segment that has been prescribed a varied amount of fertilizer compared to an initial amount of fertilizer based on a previous year may be referred to as an inspected segment.

For example, an amount of fertilizer applied to each segment of a field A at a first time, referred to as $A_0$, may be determined based on amounts of fertilizer previously applied to fields B, C and D. Data for the field history of fields B, C and D, e.g. stored at an analytical unit within a cloud server such as cloud server 208, may show that fields B, C and D share a similar type of soil as field A (e.g. the same soil composition) and have been used to grow a similar crop (e.g. corn) as field A. An amount of fertilizer $A_0$ applied to a first subset of a plurality of segments of field A, e.g. to reference segments of field A, may be a mean value of a fertilizer amount calculated from fertilizer amounts previously applied to field B, C and D at a first time, e.g. at the beginning of a growing season. An initial amount of fertilizer $A_1$ applied to a remainder of a plurality of segments of a field A, e.g. inspected segments, may be calculated as a percentage $A_1$ based on the amount of fertilizer $A_0$, as shown in example formula 5:

$$\text{percentage}(A_1) = \text{percentage}(A_0) - X \qquad \text{Formula 5}$$

Thereby, percentage $A_0$ may be 100% and X may be a percentage between 0% and 100%. E.g. X may be 30% and may relate to a reduction of a fertilizer amount in inspected segments $A_1$ of field A by a value of 30%. In an alternative embodiment, X may be dependent on the percentage of $A_0$, for example X is equal to (percentage $A_0$)/2.

A fertilizer applicator, e.g. fertilizer applicator 205, may be configured to apply at a first time, e.g. at the start of a growing season, an amount of fertilizer to each segment of a field. In an embodiment, an amount of fertilizer applied to each segment of a field at a first time may be based on a prescription, e.g. an amount of fertilizer that was applied on a segment at the beginning of previous year's growing season. In an alternative embodiment, an amount of fertilizer applied to each segment of a field at a first time may be varied based on re-captured images and re-calculated NDVI values for each segment after a time period. For example, an amount of fertilizer applied on a segment may be 100% of the fertilizer applied at the beginning of the previous year's growing season. An amount of fertilizer applied on a segment may be 95% of the fertilizer applied at the beginning of the previous year's growing season. An amount of fertilizer applied on a segment may be 90% of the fertilizer applied at the beginning of the previous year's growing season. An amount of fertilizer applied on a segment may be 85% of the fertilizer applied at the beginning of the previous year's growing season. An amount of fertilizer applied on a segment may be 80% of the fertilizer applied at the beginning of the previous year's growing season. An amount of fertilizer applied on a segment may be 70% of the fertilizer applied at the beginning of the previous year's growing season. An amount of fertilizer applied on a segment may be 60% of the fertilizer applied at the beginning of the previous year's growing season. An amount of fertilizer applied on a segment may be 50% of the fertilizer applied at the beginning of the previous year's growing season. An amount of fertilizer applied on a segment may be 40% of the fertilizer applied at the beginning of the previous year's growing season. An amount of fertilizer applied on a segment may be 30% of the fertilizer applied at the beginning of the previous year's growing season. An amount of fertilizer applied on a segment may be 20% of the fertilizer applied at the beginning of the previous year's growing season. An amount of fertilizer applied on a segment may be 10% of the fertilizer applied at the beginning of the previous year's growing season.

In an alternative embodiment, an amount of fertilizer applied to each segment of a field at a first time, e.g. at the start of a growing season, may be varied based on re-captured images and re-calculated NDVI values for each segment after a time period. For example, an amount of fertilizer applied on a segment may be 100% of the fertilizer applied at a first time, e.g. at the start of a growing season. An amount of fertilizer applied on a segment may be 95% of the fertilizer applied at a first time, e.g. at the start of a growing season. An amount of fertilizer applied on a segment may be 90% of the fertilizer applied at a first time, e.g. at the start of a growing season. An amount of fertilizer applied on a segment may be 85% of the fertilizer applied at a first time, e.g. at the start of a growing season. An amount of fertilizer applied on a segment may be 80% of the fertilizer applied at a first time, e.g. at the start of a growing season. An amount of fertilizer applied on a segment may be 70% of the fertilizer applied at a first time, e.g. at the start of a growing season. An amount of fertilizer applied on a segment may be 60% of the fertilizer applied at a first time, e.g. at the start of a growing season. An amount of fertilizer applied on a segment may be 50% of the fertilizer applied at a first time, e.g. at the start of a growing season. An amount of fertilizer applied on a segment may be 40% of the fertilizer applied at a first time, e.g. at the start of a growing season. An amount of fertilizer applied on a segment may be 30% of the fertilizer applied at a first time, e.g. at the start of a growing season. An amount of fertilizer applied on a segment may be 20% of the fertilizer applied at a first time, e.g. at the start of a growing season. An amount of fertilizer applied on a segment may be 10% of the fertilizer applied at a first time, e.g. at the start of a growing season.

During a growing season, mean NDVI values for one or more inspected segments of a field may be compared to mean NDVI values for one or more reference segments of the same field. NDVI values may be compared between different fields, e.g. neighboring fields.

The comparison of NDVI values for segments within a field (together with other sensors identifying weather and soil moisture, e.g. measured by a ground-penetrating radar) may allow the assessment of crop growth under various amounts of fertilizer under similar growing conditions, e.g. similar air/soil temperature, irrigation, soil composition. Hence, differences in the mineralization of soil or differences in climatic conditions between segments within a field may be neglected.

The fertilizer amount applied in the following time interval or during the next growing season may be varied based on a dynamic comparison of NDVI values for inspected segments and reference segments within a field.

Data acquired for fertilization levels of segments of fields and fields, e.g. the initial fertilization level for each segment may be stored in an analytical unit within a cloud server. In addition, recorded NDVI values of segments of fields and fields, e.g. the mean NDVI value for an inspected segment A of field B, may be stored in an analytical unit within a cloud server. Analytical unit of the cloud server may be configured to calculate NDVI values and to compare NDVI values for segments within a field or between different fields.

An NDVI value for a segment may thereby be compared to an NDVI value of a segment within the same field during the same growing season or using data obtained for previous growing seasons. Alternatively, an NDVI value for a segment of a field may be compared to an NDVI value of a field that is in close proximity to another field. Close proximity may relate to a neighboring field or a field within the same country or a field being exposed to similar climatic conditions.

A variation of an amount of fertilizer applied to each segment after a time period may be based on re-calculated NDVI values for each segment after a time period. No additional fertilizer may be applied to one or more of the plurality of a first subset of segments in the event that a re-calculated NDVI value, e.g. a mean NDVI value, for a subset of a plurality of the first subset of segments remains substantially the same (e.g., within a 5% tolerance range) as the NDVI value of the remainder of the plurality of segments.

A variation of an amount of fertilizer applied to each segment after a time period may be based on re-calculated NDVI values for each segment after a time period. Additional fertilizer may be applied to one or more of the plurality of a first subset of segments in the event that a re-calculated NDVI value, e.g. a mean NDVI value, for a subset of a plurality of the first subset of segments is lower than the NDVI value, e.g. a mean NDVI value, of a subset of the plurality of the remainder of the plurality of segments.

When a mean NDVI value for all of the plurality of inspected segments is calculated to fall above a predefined threshold value, the initial prescription of fertilizer applied to each of the plurality of segments at the start of the growing season is reduced. A predefined threshold value may be determined by calculation of an arithmetic mean for reference segments. An arithmetic mean for reference segments may be calculated for reference segments of a field. However, to increase statistical accuracy, NDVI values for segments of fields stored on a cloud server, e.g. cloud server 208 as depicted in FIG. 2, received from a network of other mobile platforms, such as autonomous pivots, may be used as reference NDVI values to provide a threshold value in the assessment of inspected segments. Reference NDVI values generated from other fields may be assessed with regards to its comparability to a field. For example, reference NDVI values may be used from fields that share the same climate, the same crop type or the same soil.

In an example, an arithmetic mean of an NDVI value may be calculated for reference segments of a field A. Based on the climate, crop type and soil type and growth stage, previously recorded arithmetic mean NDVI values for segments of fields B, C, D, E, F and G, that share the same climate, crop type and soil type and growth stage, may be combined with the calculated arithmetic mean NDVI value of reference segments of field A. The combined arithmetic NDVI values of fields A-G may be used to define a range of arithmetic mean NDVI values, e.g. an NDVI value range between 0.850 to 0.950. NDVI values for inspected segments of field A may then be compared to the calculated range of mean NDVI values for reference segments of fields A-G. A threshold for the assessment of inspected NDVI values of field A may be defined in relation to the range of mean NDVI values for reference segments of fields A-G. For example, if the NDVI values of inspected segments of field A are higher than the lower end of the range of reference segments (of fields A-G), e.g. the NDVI value for each inspected segment is higher than 0.850, the initial prescription of fertilizer applied to each of the plurality of segments at the start of the next growing season may be reduced.

For example, to identify, e.g. by computer system 201 or another computer system, whether an NDVI value $n_i$ recorded for an inspected segment of field F falls within a predefined threshold value defined by reference segments of field F and similar fields at the same growth stage, an NDVI value $n_i$ may be compared to a mean NDVI value of reference segments of field F (e.g. a mean NDVI value of NDVI values $n_1$, $n_2$, $n_3$, $n_4$, $n_5$, $n_6$, $n_7$, $n_8$) subtracted by a difference of percentiles $P(x)$ and $P(y)$ calculated from a histogram of previously recorded NDVI values $n_x$ for reference segments of a plurality of fields at the same growth-stage as field F.

A histogram $\Delta N$ for a plurality of fields at the same growth stage may be calculated, e.g. by computer system 201 or another computer system, by subtracting a mean NDVI value $n_0$ for a specific field of the plurality of fields at the same growth stage from the NDVI value of a reference segment $n_x$ of the specific field for a plurality of fields at the same growth stage as shown in Formula 6:

$$\Delta N = n_x - n_0 \qquad \text{Formula 6}$$

$P(x)$ and $P(y)$ may be defined as percentiles of a histogram of growth change $\Delta N$. An interval of percentiles may be defined $P(x)$ and $P(y)$, such as $P(50)-P(30)$. The percentiles may be based on user input, e.g. via computing device 201.

A threshold for an NDVI value of an inspected segment $n_i$ may be defined by a mean NDVI value (e.g. mean($n_1$ to $n_8$)) calculated for reference segments of field F and percentile intervals for a histogram of growth change $\Delta N$ based on NDVI values for a plurality of fields at the same growth stage as field F. As outlined in Formula 7, if a calculated NDVI value $n_i$ for an inspected segment of field F is smaller than the difference of a mean NDVI value for reference segments of field F and a percentile interval $P(x)$ and $P(y)$, e.g. a percentile interval between $P(50)$ and $P(30)$, the inspected segment for the NDVI value $n_i$ does not fall within the threshold. In this case, an inspected segment for an NDVI value $n_i$ requires a correction in fertilizer level.

$$n_i < \text{mean}(n_1, n_2, n_3, n_4, n_5, n_6, n_7, n_8) - [P(x) - P(y)] \qquad \text{Formula 7}$$

If a calculated NDVI value $n_i$ for an inspected segment of field F is equal or greater than the difference of the mean NDVI value for reference segments of field F and a percentile interval, e.g. a percentile interval between $P(50)$ and $P(30)$, the inspected segment for the NDVI value $n_i$ falls within the threshold. In this case an inspected segment for an NDVI value $n_i$ does not require a correction in fertilizer level.

FIG. 11 is a flow chart illustrating steps of a method of varying fertilization levels within a field. The example processes shown in FIGS. 11 and 12, and other processes described herein, may be carried out by computer system 201, or the system shown in FIG. 2, or another computer system. In the first step, at the beginning of a growing season, an amount of fertilizer is applied using a fertilizer applicator to each segment based on a prescription 1101. In the second step, after a discrete time period, images of each segment in at least two different spectral ranges are captured by a multispectral camera 1102. Captured images in at least two different spectral ranges are received by a collection unit and transmitted to a cloud server via a transponder or transceiver. In step three, at the analytics unit of a cloud server, captured images are used in the calculation of a reference Normalized Difference Vegetation Index (NDVI) value for each segment 1103. In step four, an analytics unit within a cloud server may compare NDVI values calculated for captured images within segments of a field, e.g. via comparison of NDVI values within comparison of calculated NDVI values for inspected segments and reference segments of a field 1104. Command unit of a cloud server may send instructions to a fertilizer applicator to vary the fertilizer to be applied on a field, e.g. based on the evaluation of NDVI values for inspected and reference segments within a field. After another discrete time period within a growing season, steps 1102 and 1103 may be repeated to assess crop growth during a discrete time period. Analysis of the crop growth using NDVI values may then lead to the provision of a varied amount of fertilizer to be applied to a segment as outlined in step 1104. In step 1104, an amount of fertilizer may be calculated by which an amount of fertilizer is varied, e.g. by computer system 201, or the system shown in FIG. 2, or another computer system. Analysis of growth of crops via steps 1102 and 1103 and variation of fertilizer amount may be carried out at various time intervals during a growing season to facilitate dynamic adjustment in the amount of applied fertilizer to the growth of a crop. Thus after an initial time period, different amounts of fertilizer, differing from initial amounts, may be applied.

Figure 12:
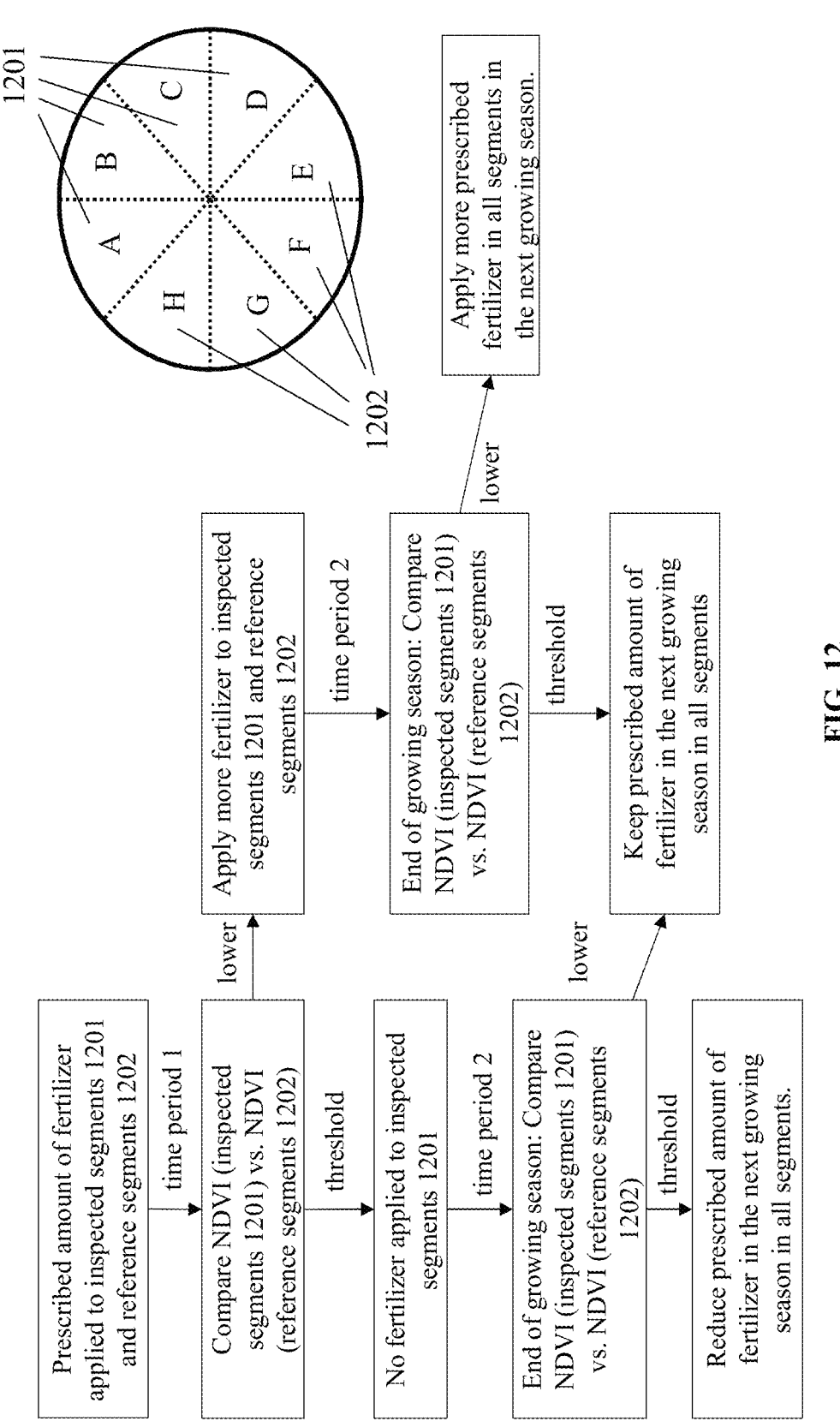
FIG. 12 is a flowchart illustrating an example of an NDVI assessment and resulting fertilizer application of inspected segments 1201 and reference segments 1202 within a field, according to an embodiment of the present invention.

FIG. 12 is a flow chart illustrating the evaluation of NDVI values and the application of fertilizer throughout a growing season for a field comprising eight segments. At the beginning of a growing season, an amount of fertilizer is pre-scribed for all segments of a field. A certain amount of fertilizer is applied to inspected segments 1201 and reference segments 1202. An amount of fertilizer applied on an inspected segment may be lower than the amount of fertilizer applied to a reference segment. After time period 1, mean NDVI values for each segment are calculated based on images captured within inspected and reference segments and are compared. A variation of an amount of fertilizer applied to each segment may be based on re-captured images and re-calculated mean NDVI values for each segment after a time period 1: If a mean NDVI value for all inspected segments is within a threshold of a mean NDVI value obtained for reference segments, no further fertilizer is applied to inspected segments 1201. However, fertilizer may be applied to reference segments 1202. After a second time period, a growing season may end and mean NDVI values are calculated based on images captured within inspected and reference segments and are compared. A variation of an amount of fertilizer applied to each segment may be based on re-captured images and re-calculated mean NDVI values for each segment after a time period 2: If a mean NDVI value for all inspected segments 1201 is within a threshold of a mean NDVI value obtained for reference segments 1202, the prescribed amount of fertilizer at the start of next year's growing season will be reduced. If the mean NDVI value for inspected segments 1201 is lower than a mean NDVI value for reference segments 1202, the same amount of prescribed amount of fertilizer for inspected segments 1201 and reference segments 1202 is used at the start of the next growing season. If, after the first time period, the mean NDVI value for an inspected segment 1201 is lower than the mean NDVI value for reference segments 1202, more fertilizer is applied to the inspected segments 1201 and to the reference segments 1202. After a second time period, a growing season may end and mean NDVI values are calculated based on images captured within inspected segments 1201 and reference segments 1202 and are compared. A variation of an amount of fertilizer applied to each segment may be based on re-captured images and re-calculated mean NDVI values for each segment after time period 2: If a mean NDVI value for inspected segments 1201 is within a threshold of the mean NDVI value obtained for reference segments 1202, the prescribed amount of fertilizer at the start of next year's growing season will be reduced. If the mean NDVI value for inspected segments 1201 is lower than the mean NDVI value for reference segments 1202, the prescribed amount of fertilizer is used at the start of the next growing season will be increased. If an NDVI value for a first subset of a plurality of segments, such as inspected segments, is recorded that is lower than the mean NDVI value for a remainder of the plurality of segments, such as reference segments (for example not within a threshold of a mean NDVI value obtained for reference segments 1202), an additional amount of fertilizer $F_{add}$ may be applied to a first subset of the plurality of segments, at a time period, e.g. at a time within a growing season. An amount of additional fertilizer may be calculated for a first subset of a plurality of segments, such as inspected segments, for example by computer system 201, or the system shown in FIG. 2, or another computer system. An amount of additional fertilizer $F_{add}$ applied to a first subset of a plurality of segments, e.g. inspected segments, may be calculated using example Formula 8:

$$F_{add} = l \cdot (1 - r) \cdot f_1(G) \cdot f_2(S) \qquad \text{Formula 8}$$

With reference to formula 8, the variable r may be defined as the ratio of fertilizer amounts of inspected segments and reference segments (typically between 0.8-0.9). Variable 1 may define an initial amount of fertilizer applied to a reference segment at a first time, e.g. at the beginning of a growing season. Variable S may be defined as the slope ratio of an NDVI curve calculated for a reference segment (generally S is assumed to take a value <1 if the NDVI value for an inspected segment does not fall within the threshold of reference segments, e.g. a threshold calculated for reference segments 1202). Variable G may be defined as the growth stage of a crop during which an NDVI value for inspected segments is recorded that is not in range of a calculated threshold for NDVI values for inspected segments. Functions $f_1$ and $f_2$ are analytic functions for slope ratio S and growth stage G of a crop. The value for $f_1(G)$ may be assumed to be 1 and the value for $f_2(S)$ may be assumed to be 1, leading to simplified example Formula 9:

$$F_{add} = l \cdot (1 - r) \qquad \text{Formula 9}$$

Thus, the amount of additional fertilizer $F_{add}$ applied to inspected segments of a field may be calculated as an initial amount of fertilizer applied to reference segments of a field multiplied by the term (1-r).

Fertilization of a field may be carried out by a fertilization applicator. For example, the applied fertilizer to a field may be a nitrogen fertilizer, a phosphate fertilizer, a potassium fertilizer or any combination thereof.

A fertilizer applicator may be configured to apply fertilizer to an area within a field. In the first growing season, an amount of fertilizer for each system may be defined based on an initial prescription. An amount of fertilizer prescribed to a segment of a field within a first growing season may be determined based on a previously recorded amount of fertilizer used in the area of the field. Alternatively, an amount of fertilizer initially applied to a field may be determined based on the conditions and nutrient levels of the soil. In another alternative embodiment, an amount of fertilizer may be determined based on a crop to be planted in the field.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system or an apparatus. Accordingly, aspects of the present invention may take the form of an entirely hardware embodiment or an embodiment combining software and hardware aspects that may all generally be referred to herein as a "circuit," "module" or "system."

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

What claimed is:

1. A method of varying fertilization levels within a field, the field being divided into a plurality of segments, the method comprising:

applying, by a mobile platform with a ground-penetrating radar sensor, at a first time an amount of fertilizer to each segment;

capturing images of each segment in at least two different spectral ranges after a time period;

calculating a reference Normalized Difference Vegetation Index (NDVI) value for each segment based on the captured images, wherein the calculation of the NDVI value incorporates a determination of one or more of:

(i) specific locations of leaves within each plant, and (ii) specific regions within each leaf; and varying the amount of fertilizer applied to each segment after the time period, wherein the amount of fertilizer is varied based on re-captured images and re-calculated NDVI values for each segment after the time period, wherein the NDVI value is calculated according to the formula:

$$NDVI = (\alpha A + \beta B + \gamma C + \delta) / (\varphi A + \chi B + \psi C + \xi)$$

where A, B and C are spectral reflectance measurements acquired from the images captured in the infrared, red and green spectral ranges, and where $\alpha$, $\beta$, $\gamma$, $\delta$, $\varphi$, $\chi$, $\psi$ and $\xi$ are constants.

2. The method according to claim 1, wherein the amount of fertilizer applied at the first time is according to a prescription which defines an amount of fertilizer that is applied to a first subset of the plurality of segments, comparative to a remainder of the plurality of segments.

3. The method according to claim 2, wherein no further fertilizer is applied to one or more of the plurality of the first subset of segments when the re-calculated NDVI value of a subset of a plurality of the first subset of segments remains the same as the NDVI value of the remainder of the plurality of segments.

4. The method according to claim 2, wherein additional fertilizer is applied to one or more of the plurality of the first subset of segments when the re-calculated NDVI value of a subset of a plurality of the first subset of segments is lower than the NDVI value of a subset of a plurality of the remainder of the plurality of segments.

5. The method according to claim 2, wherein the prescription of fertilizer applied to each of the plurality of the segments at a start of a next growing season is reduced when the NDVI value for all of the plurality of the first subset of segments is calculated to fall above a predefined threshold value.

6. The method according to claim 1, wherein the images of each segment are captured and recaptured in the infrared, red and green spectral ranges.

7. The method according to claim 1, wherein the captured images of each segment are collected from multiple different positions from within the plurality of segments, and wherein the NDVI value of each segment is averaged over all NDVI values obtained for each set of images captured of that segment to improve statistical accuracy.

8. The method according to claim 1, wherein the calculation of the NDVI value is corrected in relation to one or more of:
   (i) a number of leaves within a plant,
   (ii) a total leaf area,
   (iii) an estimate of a total plant-mass,
   (iv) a respective leaf angular orientation,
   (v) a relative distance from a camera,
   (vi) an accurate seeding time,
   (vii) an irrigation history, and
   (viii) a field history from previous seasons.

9. A system for varying fertilization levels within a field, the field being divided into a plurality of segments, the system comprising:
   a memory component configured to store computer implementable instructions;
   a mobile platform with a ground-penetrating radar sensor, wherein the mobile platform is configured to move about the field; and
   a processor configured to implement the computer implementable instructions, such that the mobile platform is operable to:
      apply at a first time an amount of fertilizer, using a fertilizer applicator, to each segment;
      capture images of each segment in at least two different spectral ranges after a time period;
      calculate a Normalized Difference Vegetation Index (NDVI) value for each segment of the field based on the captured images, wherein the calculation of the NDVI value incorporates a determination of one or more of:
      (i) specific locations of leaves within each plant, and
      (ii) specific regions within each leaf; and
      vary the amount of fertilizer applied to each segment after the time period, wherein the amount of fertilizer is varied based on re-captured images and re-calculated NDVI values for each segment after the time period.

10. The system according to claim 9, the mobile platform comprising:

a motor and a plurality of wheels for maneuvering the mobile platform;
a multispectral camera configured to capture images in at least two different spectral ranges;
a fertilizer applicator;
a collection unit;
a transponder;
a geolocation and time sensor; and
a cloud server, comprising:
   a memory component configured to store computer implementable instructions;
   a control unit; and
   an analytical unit.

11. The system according to claim 10, wherein the amount of fertilizer applied at the first time is according to a prescription which defines an amount of fertilizer that is applied to a first subset of the plurality of segments comparative to a remainder of the plurality of segments.

12. The system according to claim 11, wherein no further fertilizer is applied to one or more of the plurality of the first subset of segments when the calculated NDVI value of the subset of a plurality of the first subset of segments remains the same as the NDVI value of the remainder of the plurality of segments.

13. The system according to claim 11, wherein additional fertilizer is applied to one or more of the plurality of the first subset of segments when the NDVI value is lower than the NDVI value of the remainder of the plurality of segments.

14. The system according to claim 11, wherein the prescription of fertilizer applied to each of the plurality of segments at a start of a next growing season is reduced when the NDVI value for all of the plurality of the first subset of segments is calculated to fall above a predefined threshold value.

15. The system according to claim 10, wherein the images of each segment captured using the multispectral camera are in the infrared, red and green spectral ranges.

16. The system according to claim 10, wherein the mobile platform is maneuvered about the field such that the images of each segment are captured from multiple different positions from within the segments, and wherein the NDVI value of each segment is averaged over all images captured of that segment to improve statistical accuracy.

17. The system according to claim 10, wherein the system comprises a communications subsystem, and wherein the mobile platform is remotely controlled by a human operator using the communications subsystem.

18. The system according to claim 12, wherein the system comprises one or more proximity sensors, and wherein the processor is configured to autonomously navigate the mobile platform about the field using the proximity sensors.

19. The system according to claim 10, wherein the mobile platform comprises one or more of: a rain sensor, a temperature sensor, a chlorophyll camera, and a pressure sensor.

20. The system according to claim 10, wherein the cloud server is configured to receive data from a plurality of connected mobile platforms of a plurality of fields.

21. The system according to claim 20, wherein the amount of fertilizer is determined based on data received from a plurality of connected mobile platforms of a plurality of fields.

22. A method of varying amounts of fertilizer in a plurality of field segments based on Normalized Difference Vegetation Index (NDVI) values, the method comprising:
   applying, by a mobile platform with a ground-penetrating radar sensor, initial amounts of fertilizer to a plurality of field segments;

recording a plurality of images of each segment of the plurality of field segments after a time period, wherein each image is captured in a plurality of spectral ranges;

calculating NDVI values for each segment of the plurality of field segments based on the images, wherein the calculation of the NDVI values incorporates a determination of one or more of:

(i) specific locations of leaves within each plant, and (ii) specific regions within each leaf; and applying, by the mobile platform, amounts of fertilizer different from the initial amounts of fertilizer to each segment of the plurality of segments after the time period, based on re-captured images and re-calculated NDVI values for each segment of the plurality of field segments after the time period, wherein the NDVI value is calculated according to the formula:

$$NDVI=(\alpha A+\beta B+\gamma C+\delta)/(\varphi A+\chi B+\psi C+\xi)$$

where A, B and C are spectral reflectance measurements acquired from the images captured in the infrared, red and green spectral ranges, and where $\alpha$, $\beta$, $\gamma$, $\delta$, $\varphi$, $\chi$, $\psi$ and $\xi$ are constants.

\* \* \* \* \*